US009360995B2

(12) United States Patent (10) Patent No.: US 9,360,995 B2
Hart et al. (45) Date of Patent: *Jun. 7, 2016

(54) USER INTERFACE FOR ELECTRONIC BACKUP

(75) Inventors: David Hart, San Francisco, CA (US); Mike Matas, San Francisco, CA (US); Pavel Cisler, Los Gatos, CA (US); Kevin Tiene, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 686 days.

This patent is subject to a terminal disclaimer.

(21) Appl. No.: 13/211,273

(22) Filed: Aug. 16, 2011

(65) Prior Publication Data

US 2011/0302502 A1 Dec. 8, 2011

Related U.S. Application Data

(63) Continuation of application No. 11/760,708, filed on Jun. 8, 2007, now Pat. No. 8,010,900.

(51) Int. Cl.
*G06F 3/0482* (2013.01)
*G06F 11/14* (2006.01)

(52) U.S. Cl.
CPC .......... *G06F 3/0482* (2013.01); *G06F 11/1448* (2013.01); *G06F 11/1469* (2013.01); *G06F 2201/84* (2013.01)

(58) Field of Classification Search
CPC ... G06F 9/4443; G06F 9/543; G06F 3/04815; G06F 11/1469; G06F 11/1446; G06F 11/1448; G06F 11/1451; G06F 11/1458; G06F 2201/84; G06F 3/0481–3/0489
USPC .......................... 715/747, 748, 769, 770, 778
See application file for complete search history.

(56) References Cited

U.S. PATENT DOCUMENTS

| 5,150,407 A | 9/1992 | Chan |
| 5,150,473 A | 9/1992 | Zulch |

(Continued)

FOREIGN PATENT DOCUMENTS

| EP | 0629950 | 12/1994 |
| EP | 1152352 | 11/2001 |

(Continued)

OTHER PUBLICATIONS

Chen et al., "Data Redundancy and Compression Methods for a Disk-based Network Backup System", 2004, IEEE, pp. 1-8.

(Continued)

*Primary Examiner* — Steven B Theriault
(74) *Attorney, Agent, or Firm* — Fish & Richardson P.C.

(57) ABSTRACT

Systems and methods are provided for storing and restoring digital data. A method includes receiving, a first user input requesting that a backup interface be displayed, displaying the backup interface, the backup interface including a display area for presenting at least a first visual representation of an earlier version of a current view and a visual representation of the current view, the earlier version including a first element, receiving, while the backup interface is displayed, a second user input requesting that the current view be modified according to the earlier version, at least with regard to the first element, animating the modification of the first element as moving from the visual representation of the earlier version to the visual representation of the current view, and modifying, in response to the second user input, the current view according to the earlier version, at least with regard to the first element.

18 Claims, 20 Drawing Sheets

(56) References Cited

U.S. PATENT DOCUMENTS

| | | | |
|---|---|---|---|
| 5,163,148 A | 11/1992 | Walls | |
| 5,276,867 A | 1/1994 | Kenley et al. | |
| 5,349,658 A | 9/1994 | O'Rourke et al. | |
| 5,369,570 A | 11/1994 | Parad | |
| 5,574,846 A * | 11/1996 | Yoshimura et al. | 345/418 |
| 5,659,614 A | 8/1997 | Bailey | |
| 5,664,186 A | 9/1997 | Bennett et al. | |
| 5,680,562 A | 10/1997 | Conrad et al. | |
| 5,736,974 A | 4/1998 | Selker | |
| 5,745,669 A | 4/1998 | Hugard et al. | |
| 5,754,178 A | 5/1998 | Johnston et al. | |
| 5,758,359 A | 5/1998 | Saxon | |
| 5,790,120 A | 8/1998 | Lozares et al. | |
| 5,802,175 A | 9/1998 | Kara | |
| 5,818,936 A | 10/1998 | Mashayekhi | |
| 5,819,032 A | 10/1998 | De Vries et al. | |
| 5,819,292 A | 10/1998 | Hitz et al. | |
| 5,831,617 A | 11/1998 | Bhukhanwala | |
| 5,832,526 A | 11/1998 | Schuyler | |
| 5,961,605 A | 10/1999 | Deng et al. | |
| 5,987,566 A | 11/1999 | Vishlitzky et al. | |
| 6,006,227 A | 12/1999 | Freeman et al. | |
| 6,023,506 A | 2/2000 | Ote et al. | |
| 6,054,989 A * | 4/2000 | Robertson et al. | 715/848 |
| 6,097,313 A | 8/2000 | Takahashi et al. | |
| 6,112,318 A | 8/2000 | Jouppi et al. | |
| 6,121,969 A * | 9/2000 | Jain et al. | 715/850 |
| 6,134,660 A | 10/2000 | Boneh et al. | |
| 6,167,532 A | 12/2000 | Wisecup | |
| 6,188,405 B1 | 2/2001 | Czerwinski et al. | |
| 6,269,381 B1 | 7/2001 | St. Pierre et al. | |
| 6,366,988 B1 | 4/2002 | Skiba et al. | |
| 6,396,500 B1 | 5/2002 | Qureshi et al. | |
| 6,397,308 B1 | 5/2002 | Ofek et al. | |
| 6,424,626 B1 | 7/2002 | Kidambi et al. | |
| 6,460,055 B1 | 10/2002 | Midgley et al. | |
| 6,493,745 B1 | 12/2002 | Cherian | |
| 6,553,392 B1 | 4/2003 | Mosher, Jr. et al. | |
| 6,574,733 B1 | 6/2003 | Langford | |
| 6,600,501 B1 * | 7/2003 | Israel et al. | 715/810 |
| 6,604,118 B2 | 8/2003 | Kleiman et al. | |
| 6,625,704 B2 | 9/2003 | Winokur | |
| 6,629,129 B1 | 9/2003 | Bookspan et al. | |
| 6,636,937 B2 | 10/2003 | Peter | |
| 6,638,313 B1 | 10/2003 | Freeman et al. | |
| 6,701,454 B1 | 3/2004 | Fischer et al. | |
| 6,711,572 B2 | 3/2004 | Zakharov et al. | |
| 6,714,201 B1 | 3/2004 | Grinstein et al. | |
| 6,714,952 B2 | 3/2004 | Dunham et al. | |
| 6,724,918 B1 * | 4/2004 | Yen et al. | 382/113 |
| 6,725,427 B2 | 4/2004 | Freeman et al. | |
| 6,728,735 B1 | 4/2004 | Fong | |
| 6,750,890 B1 * | 6/2004 | Sugimoto | 715/838 |
| 6,760,723 B2 * | 7/2004 | Oshinsky et al. | 707/758 |
| 6,768,999 B2 | 7/2004 | Prager et al. | |
| 6,785,751 B1 | 8/2004 | Connor | |
| 6,785,786 B1 | 8/2004 | Gold et al. | |
| 6,801,229 B1 | 10/2004 | Tinkler | |
| 6,836,657 B2 | 12/2004 | Ji et al. | |
| 6,857,001 B2 | 2/2005 | Hitz et al. | |
| 6,892,211 B2 | 5/2005 | Hitz et al. | |
| 6,901,493 B1 | 5/2005 | Maffezzoni | |
| 6,918,124 B1 | 7/2005 | Novik et al. | |
| 6,947,556 B1 | 9/2005 | Matyas et al. | |
| 6,948,039 B2 | 9/2005 | Biessener et al. | |
| 6,959,368 B1 | 10/2005 | St. Pierre et al. | |
| 6,993,710 B1 | 1/2006 | Coad et al. | |
| 7,069,402 B2 | 6/2006 | Coulter et al. | |
| 7,072,916 B1 | 7/2006 | Lewis et al. | |
| 7,099,900 B1 | 8/2006 | Bromley et al. | |
| 7,103,740 B1 | 9/2006 | Colgrove et al. | |
| 7,107,527 B2 | 9/2006 | Takahashi et al. | |
| 7,111,136 B2 | 9/2006 | Yamagami | |
| 7,133,902 B2 | 11/2006 | Saha et al. | |
| 7,134,026 B2 | 11/2006 | Horiuchi et al. | |
| 7,155,486 B2 | 12/2006 | Aoshima et al. | |
| 7,174,352 B2 | 2/2007 | Kleiman et al. | |
| 7,185,028 B2 | 2/2007 | Lechner | |
| 7,200,617 B2 | 4/2007 | Kibuse | |
| 7,213,040 B1 * | 5/2007 | Stokes et al. | |
| 7,222,194 B2 | 5/2007 | Kano et al. | |
| 7,243,310 B2 * | 7/2007 | Crain et al. | 715/853 |
| 7,257,717 B2 | 8/2007 | Huang | |
| 7,275,075 B2 | 9/2007 | Cannon | |
| 7,284,190 B2 | 10/2007 | Chellis et al. | |
| 7,289,973 B2 | 10/2007 | Kiessig et al. | |
| 7,318,134 B1 | 1/2008 | Oliveira et al. | |
| 7,320,076 B2 | 1/2008 | Caronni | |
| 7,386,801 B1 | 6/2008 | Horvitz et al. | |
| 7,401,194 B2 | 7/2008 | Jewell | |
| 7,418,619 B1 | 8/2008 | Uhlmann et al. | |
| 7,421,449 B2 * | 9/2008 | Williams et al. | |
| 7,434,164 B2 | 10/2008 | Salesin et al. | |
| 7,434,177 B1 | 10/2008 | Ording et al. | |
| 7,440,125 B2 | 10/2008 | Maekawa et al. | |
| 7,483,693 B2 | 1/2009 | Lueng et al. | |
| 7,505,762 B2 | 3/2009 | Onyon et al. | |
| 7,518,611 B2 | 4/2009 | Boyd et al. | |
| 7,558,930 B2 | 7/2009 | Kitamura et al. | |
| 7,559,016 B1 | 7/2009 | Rakowski et al. | |
| 7,574,459 B2 | 8/2009 | Sen et al. | |
| 7,590,668 B2 | 9/2009 | Kathuria et al. | |
| 7,596,586 B2 | 9/2009 | Gokhale et al. | |
| 7,600,133 B2 | 10/2009 | Long et al. | |
| 7,620,670 B2 | 11/2009 | Tokuda et al. | |
| 7,624,133 B1 | 11/2009 | Ojalvo | |
| 7,630,021 B2 | 12/2009 | Matsuzaka et al. | |
| 7,657,450 B2 | 2/2010 | Amit et al. | |
| 7,660,817 B2 | 2/2010 | Smith et al. | |
| 7,669,141 B1 * | 2/2010 | Pegg | 715/781 |
| 7,676,689 B1 | 3/2010 | Shioyama et al. | |
| 7,703,044 B2 * | 4/2010 | Graham | 715/838 |
| 7,711,771 B2 | 5/2010 | Kirnos | |
| 7,716,171 B2 * | 5/2010 | Kryger | 707/649 |
| 7,734,594 B2 | 6/2010 | Wang | |
| 7,735,018 B2 * | 6/2010 | Bakhash | 715/782 |
| 7,739,464 B1 | 6/2010 | Coulter et al. | |
| 7,739,622 B2 | 6/2010 | DeLine et al. | |
| 7,743,347 B2 * | 6/2010 | Graham et al. | 715/863 |
| 7,747,655 B2 * | 6/2010 | Hull et al. | 707/802 |
| 7,752,573 B2 * | 7/2010 | Shiba et al. | 715/835 |
| 7,761,456 B1 | 7/2010 | Cram et al. | |
| 7,774,718 B2 * | 8/2010 | Finke-Anlauff et al. | 715/833 |
| 7,788,080 B2 * | 8/2010 | Graham et al. | 703/21 |
| 7,788,592 B2 * | 8/2010 | Williams et al. | 715/764 |
| 7,800,615 B2 * | 9/2010 | MacPherson | 345/440 |
| 7,809,687 B2 * | 10/2010 | Cisler et al. | 707/654 |
| 7,809,688 B2 | 10/2010 | Cisler et al. | |
| 7,836,311 B2 | 11/2010 | Kuriya et al. | |
| 7,853,566 B2 | 12/2010 | Cisler et al. | |
| 7,853,567 B2 | 12/2010 | Cisler et al. | |
| 7,856,424 B2 | 12/2010 | Cisler et al. | |
| 7,860,839 B2 | 12/2010 | Cisler et al. | |
| 7,882,072 B1 | 2/2011 | Axe et al. | |
| 7,890,527 B1 | 2/2011 | Nene et al. | |
| 7,899,829 B1 * | 3/2011 | Malla | 707/741 |
| 7,934,064 B1 | 4/2011 | Per et al. | |
| 7,953,730 B1 | 5/2011 | Bleckner | |
| 7,999,810 B1 * | 8/2011 | Boice et al. | 345/473 |
| 8,010,900 B2 | 8/2011 | Hart et al. | |
| 8,024,292 B2 | 9/2011 | Thompson et al. | |
| 8,055,911 B2 | 11/2011 | Feng et al. | |
| 8,099,392 B2 | 1/2012 | Paterson et al. | |
| 8,161,410 B2 * | 4/2012 | Bray | 715/848 |
| 8,166,415 B2 | 4/2012 | Cisler et al. | |
| 8,209,308 B2 * | 6/2012 | Rueben et al. | 707/705 |
| 8,219,995 B2 | 7/2012 | Flemming et al. | |
| 8,229,897 B2 | 7/2012 | Cannon et al. | |
| 8,234,591 B1 * | 7/2012 | Dhawan et al. | 715/838 |
| 8,245,078 B1 | 8/2012 | Chatterjee et al. | |
| 8,260,770 B2 | 9/2012 | Bell et al. | |
| 8,375,318 B2 * | 2/2013 | Masuda et al. | 715/772 |
| 8,484,569 B2 * | 7/2013 | Carlson et al. | 715/751 |
| 8,490,019 B2 * | 7/2013 | Jarrett et al. | 715/838 |

(56) References Cited

U.S. PATENT DOCUMENTS

| | | | |
|---|---|---|---|
| 8,495,024 B2 | 7/2013 | Cisler et al. | |
| 8,533,593 B2* | 9/2013 | Grossman et al. | 715/704 |
| 8,627,195 B1 | 1/2014 | Hayden | |
| 8,775,378 B2 | 7/2014 | Cisler et al. | |
| 8,839,087 B1 | 9/2014 | Hayden | |
| 9,009,115 B2* | 4/2015 | Cisler et al. | 707/654 |
| 9,134,879 B2* | 9/2015 | Kumamoto | |
| 2001/0047368 A1* | 11/2001 | Oshinsky et al. | 707/204 |
| 2001/0055317 A1 | 12/2001 | Kajizaki et al. | |
| 2002/0016912 A1 | 2/2002 | Johnson | |
| 2002/0023198 A1 | 2/2002 | Kokubun et al. | |
| 2002/0046220 A1 | 4/2002 | Freeman et al. | |
| 2002/0049883 A1 | 4/2002 | Schneider et al. | |
| 2002/0054158 A1 | 5/2002 | Asami | |
| 2002/0063737 A1* | 5/2002 | Feig et al. | 345/786 |
| 2002/0065999 A1 | 5/2002 | Kikuchi et al. | |
| 2002/0075322 A1* | 6/2002 | Rosenzweig et al. | 345/835 |
| 2002/0080180 A1 | 6/2002 | Mander et al. | |
| 2002/0107886 A1* | 8/2002 | Gentner et al. | 707/511 |
| 2002/0112237 A1 | 8/2002 | Kelts | |
| 2002/0120648 A1* | 8/2002 | Ball et al. | 707/511 |
| 2002/0156921 A1 | 10/2002 | Dutta et al. | |
| 2002/0160760 A1 | 10/2002 | Aoyama | |
| 2002/0174283 A1 | 11/2002 | Lin | |
| 2003/0016248 A1 | 1/2003 | Hayes Ubillos | |
| 2003/0018878 A1 | 1/2003 | Dorward et al. | |
| 2003/0038831 A1* | 2/2003 | Engelfriet | 345/719 |
| 2003/0050940 A1 | 3/2003 | Robinson | |
| 2003/0063128 A1 | 4/2003 | Salmimaa et al. | |
| 2003/0065687 A1 | 4/2003 | Momiji et al. | |
| 2003/0097640 A1* | 5/2003 | Abrams et al. | 715/530 |
| 2003/0122874 A1 | 7/2003 | Dieberger et al. | |
| 2003/0126247 A1 | 7/2003 | Strasser et al. | |
| 2003/0131007 A1 | 7/2003 | Schirmer et al. | |
| 2003/0135650 A1 | 7/2003 | Kano et al. | |
| 2003/0137540 A1 | 7/2003 | Klevenz et al. | |
| 2003/0167380 A1 | 9/2003 | Green et al. | |
| 2003/0172937 A1 | 9/2003 | Faries et al. | |
| 2003/0177149 A1* | 9/2003 | Coombs | 707/204 |
| 2003/0182332 A1 | 9/2003 | McBrearty et al. | |
| 2003/0195903 A1 | 10/2003 | Manley et al. | |
| 2003/0220949 A1 | 11/2003 | Witt et al. | |
| 2004/0003351 A1* | 1/2004 | Sommerer et al. | 715/517 |
| 2004/0044707 A1 | 3/2004 | Richard | |
| 2004/0066414 A1 | 4/2004 | Czerwinski et al. | |
| 2004/0073560 A1 | 4/2004 | Edwards | |
| 2004/0078641 A1 | 4/2004 | Fleischmann | |
| 2004/0088331 A1 | 5/2004 | Therrien et al. | |
| 2004/0117459 A1 | 6/2004 | Fry | |
| 2004/0125137 A1 | 7/2004 | Stata et al. | |
| 2004/0125150 A1* | 7/2004 | Adcock et al. | 345/810 |
| 2004/0133575 A1 | 7/2004 | Farmer et al. | |
| 2004/0139396 A1 | 7/2004 | Gelernter et al. | |
| 2004/0143652 A1 | 7/2004 | Grannan et al. | |
| 2004/0153973 A1* | 8/2004 | Horwitz | 715/530 |
| 2004/0163009 A1 | 8/2004 | Goldstein et al. | |
| 2004/0167942 A1 | 8/2004 | Oshinsky et al. | |
| 2004/0175000 A1 | 9/2004 | Caronni | |
| 2004/0193953 A1 | 9/2004 | Callahan et al. | |
| 2004/0199779 A1 | 10/2004 | Huang | |
| 2004/0199826 A1 | 10/2004 | Bertram et al. | |
| 2004/0210608 A1 | 10/2004 | Lee et al. | |
| 2004/0220965 A1 | 11/2004 | Harville et al. | |
| 2004/0220980 A1 | 11/2004 | Forster | |
| 2004/0222992 A1* | 11/2004 | Calkins et al. | 345/473 |
| 2004/0228493 A1 | 11/2004 | Ma | |
| 2004/0230892 A1 | 11/2004 | Horton | |
| 2004/0235523 A1 | 11/2004 | Schrire et al. | |
| 2004/0236769 A1 | 11/2004 | Smith et al. | |
| 2004/0236916 A1 | 11/2004 | Berkowitz et al. | |
| 2004/0236958 A1 | 11/2004 | Teicher et al. | |
| 2004/0267700 A1 | 12/2004 | Dumais et al. | |
| 2005/0010955 A1 | 1/2005 | Elia et al. | |
| 2005/0047295 A1 | 3/2005 | Kim et al. | |
| 2005/0071390 A1 | 3/2005 | Midgley et al. | |
| 2005/0086613 A1* | 4/2005 | McKnight et al. | 715/855 |
| 2005/0091596 A1 | 4/2005 | Anthony et al. | |
| 2005/0097475 A1* | 5/2005 | Makioka et al. | 715/792 |
| 2005/0102329 A1 | 5/2005 | Jiang et al. | |
| 2005/0102695 A1 | 5/2005 | Musser | |
| 2005/0108253 A1 | 5/2005 | Metsatahti et al. | |
| 2005/0138013 A1 | 6/2005 | Walker et al. | |
| 2005/0138066 A1* | 6/2005 | Finke-Anlauff et al. | 707/104.1 |
| 2005/0138081 A1 | 6/2005 | Alshab et al. | |
| 2005/0144135 A1 | 6/2005 | Juarez et al. | |
| 2005/0149577 A1 | 7/2005 | Okada et al. | |
| 2005/0165867 A1 | 7/2005 | Barton et al. | |
| 2005/0187992 A1 | 8/2005 | Prahlad et al. | |
| 2005/0204186 A1 | 9/2005 | Rothman et al. | |
| 2005/0216520 A1 | 9/2005 | He et al. | |
| 2005/0216527 A1* | 9/2005 | Erlingsson | 707/202 |
| 2005/0246398 A1 | 11/2005 | Barzilai et al. | |
| 2005/0262168 A1 | 11/2005 | Helliker et al. | |
| 2005/0262377 A1 | 11/2005 | Sim-Tang | |
| 2006/0026218 A1 | 2/2006 | Urmston | |
| 2006/0036568 A1 | 2/2006 | Moore et al. | |
| 2006/0041603 A1 | 2/2006 | Paterson et al. | |
| 2006/0041823 A1 | 2/2006 | Wolfgang et al. | |
| 2006/0053332 A1 | 3/2006 | Uhlmann et al. | |
| 2006/0064444 A1 | 3/2006 | Van Ingen et al. | |
| 2006/0064634 A1 | 3/2006 | Dettinger et al. | |
| 2006/0080521 A1 | 4/2006 | Barr et al. | |
| 2006/0085792 A1 | 4/2006 | Traut | |
| 2006/0085817 A1 | 4/2006 | Kim et al. | |
| 2006/0088167 A1 | 4/2006 | Bade et al. | |
| 2006/0101384 A1* | 5/2006 | Sim-Tang et al. | 717/104 |
| 2006/0106893 A1 | 5/2006 | Daniels et al. | |
| 2006/0117022 A1 | 6/2006 | Lucas | |
| 2006/0117309 A1 | 6/2006 | Singhal et al. | |
| 2006/0129496 A1 | 6/2006 | Chow et al. | |
| 2006/0137010 A1 | 6/2006 | Kramer et al. | |
| 2006/0143250 A1 | 6/2006 | Peterson et al. | |
| 2006/0150107 A1 | 7/2006 | Leung et al. | |
| 2006/0156246 A1 | 7/2006 | Williams et al. | |
| 2006/0156259 A1* | 7/2006 | Wagner et al. | 715/963 |
| 2006/0161861 A1 | 7/2006 | Holecek et al. | |
| 2006/0173848 A1 | 8/2006 | Peterson et al. | |
| 2006/0200754 A1 | 9/2006 | Kablesh et al. | |
| 2006/0206460 A1 | 9/2006 | Gadkari | |
| 2006/0218363 A1 | 9/2006 | Palapudi | |
| 2006/0224956 A1 | 10/2006 | Storisteanu et al. | |
| 2006/0235907 A1 | 10/2006 | Kathuria et al. | |
| 2006/0236406 A1 | 10/2006 | Johnson | |
| 2006/0248294 A1 | 11/2006 | Nedved et al. | |
| 2006/0253470 A1 | 11/2006 | Friedman et al. | |
| 2006/0288205 A1 | 12/2006 | Linares | |
| 2007/0015118 A1* | 1/2007 | Nickell et al. | 434/118 |
| 2007/0027935 A1 | 2/2007 | Haselton et al. | |
| 2007/0030528 A1 | 2/2007 | Quaeler et al. | |
| 2007/0038884 A1 | 2/2007 | Campbell et al. | |
| 2007/0043715 A1 | 2/2007 | Kaushik et al. | |
| 2007/0043790 A1 | 2/2007 | Kryger | |
| 2007/0070066 A1* | 3/2007 | Bakhash | 345/419 |
| 2007/0078910 A1 | 4/2007 | Bopardikar | |
| 2007/0088702 A1 | 4/2007 | Fridella et al. | |
| 2007/0094312 A1 | 4/2007 | Sim-Tang | |
| 2007/0106978 A1 | 5/2007 | Felts | |
| 2007/0117459 A1 | 5/2007 | Chen | |
| 2007/0130232 A1* | 6/2007 | Therrien et al. | 707/204 |
| 2007/0136381 A1 | 6/2007 | Cannon et al. | |
| 2007/0136389 A1 | 6/2007 | Bergant et al. | |
| 2007/0136423 A1 | 6/2007 | Gilmore et al. | |
| 2007/0143425 A1 | 6/2007 | Kieselbach et al. | |
| 2007/0150326 A1 | 6/2007 | Nakao et al. | |
| 2007/0156772 A1 | 7/2007 | Lechner | |
| 2007/0168497 A1 | 7/2007 | Locker et al. | |
| 2007/0174580 A1 | 7/2007 | Shulga | |
| 2007/0180268 A1 | 8/2007 | Filimon et al. | |
| 2007/0185879 A1 | 8/2007 | Roublev et al. | |
| 2007/0185922 A1 | 8/2007 | Kapoor et al. | |
| 2007/0186127 A1 | 8/2007 | Desai et al. | |
| 2007/0192386 A1 | 8/2007 | Fries et al. | |
| 2007/0245238 A1* | 10/2007 | Fugitt et al. | 715/700 |
| 2007/0266007 A1 | 11/2007 | Arrouye et al. | |

(56) References Cited

U.S. PATENT DOCUMENTS

| | | |
|---|---|---|
| 2007/0271263 A1 | 11/2007 | Merrild |
| 2007/0271303 A1 | 11/2007 | Menendez et al. |
| 2007/0282854 A1 | 12/2007 | Bhogal et al. |
| 2007/0288536 A1 | 12/2007 | Sen et al. |
| 2008/0016576 A1 | 1/2008 | Ueda et al. |
| 2008/0022393 A1 | 1/2008 | Waltermann et al. |
| 2008/0028007 A1 | 1/2008 | Ishii et al. |
| 2008/0033922 A1 | 2/2008 | Cisler et al. |
| 2008/0033969 A1 | 2/2008 | Koo et al. |
| 2008/0034004 A1 | 2/2008 | Cisler et al. |
| 2008/0034011 A1 | 2/2008 | Cisler et al. |
| 2008/0034013 A1 | 2/2008 | Cisler et al. |
| 2008/0034016 A1 | 2/2008 | Cisler et al. |
| 2008/0034017 A1 | 2/2008 | Giampaolo et al. |
| 2008/0034018 A1 | 2/2008 | Cisler et al. |
| 2008/0034019 A1 | 2/2008 | Cisler et al. |
| 2008/0034039 A1 | 2/2008 | Cisler et al. |
| 2008/0046557 A1 | 2/2008 | Cheng |
| 2008/0059894 A1 | 3/2008 | Cisler et al. |
| 2008/0065663 A1 | 3/2008 | Farlee et al. |
| 2008/0070496 A1 | 3/2008 | Jackson |
| 2008/0071796 A1 | 3/2008 | Ghuneim |
| 2008/0077808 A1 | 3/2008 | Teicher et al. |
| 2008/0082578 A1 | 4/2008 | Hogue et al. |
| 2008/0091655 A1 | 4/2008 | Gokhale et al. |
| 2008/0126441 A1 | 5/2008 | Cisler et al. |
| 2008/0126442 A1 | 5/2008 | Cisler et al. |
| 2008/0133487 A1 | 6/2008 | Gross |
| 2008/0141029 A1 | 6/2008 | Culver |
| 2008/0162999 A1 | 7/2008 | Schlueter et al. |
| 2008/0168184 A1 | 7/2008 | Freedman et al. |
| 2008/0168245 A1 | 7/2008 | De Atley et al. |
| 2008/0168391 A1 | 7/2008 | Robbin et al. |
| 2008/0172607 A1 | 7/2008 | Baer |
| 2008/0177961 A1 | 7/2008 | McSharry et al. |
| 2008/0208630 A1 | 8/2008 | Fors et al. |
| 2008/0214163 A1 | 9/2008 | Onyon et al. |
| 2008/0216011 A1 | 9/2008 | Gould |
| 2008/0222512 A1 | 9/2008 | Albornoz et al. |
| 2008/0229037 A1 | 9/2008 | Bunte et al. |
| 2008/0250314 A1* | 10/2008 | Larsen ............ 715/705 |
| 2008/0250342 A1 | 10/2008 | Clark et al. |
| 2008/0250400 A1 | 10/2008 | Vertes |
| 2008/0256138 A1* | 10/2008 | Sim-Tang ............ 707/202 |
| 2008/0285754 A1 | 11/2008 | Kezmann |
| 2008/0307000 A1 | 12/2008 | Paterson et al. |
| 2008/0307017 A1 | 12/2008 | Lyons et al. |
| 2008/0307018 A1 | 12/2008 | Ulrich et al. |
| 2008/0307019 A1 | 12/2008 | Weiss et al. |
| 2008/0307020 A1 | 12/2008 | Ko et al. |
| 2008/0307175 A1 | 12/2008 | Hart et al. |
| 2008/0307333 A1 | 12/2008 | McInerney et al. |
| 2008/0307347 A1 | 12/2008 | Cisler et al. |
| 2008/0310628 A1 | 12/2008 | Fujioka et al. |
| 2008/0310633 A1 | 12/2008 | Brown et al. |
| 2008/0313243 A1 | 12/2008 | Poston et al. |
| 2009/0019291 A1 | 1/2009 | Murray |
| 2009/0031401 A1 | 1/2009 | Cudich et al. |
| 2009/0052669 A1 | 2/2009 | Ma |
| 2009/0254591 A1 | 10/2009 | Weiss et al. |
| 2009/0307333 A1 | 12/2009 | Welingkar et al. |
| 2010/0017855 A1 | 1/2010 | Johnson et al. |
| 2010/0063960 A1 | 3/2010 | Lehto |
| 2010/0217929 A1 | 8/2010 | Kirshenbaum et al. |
| 2010/0306171 A1* | 12/2010 | Antos et al. ............ 707/638 |
| 2010/0312754 A1* | 12/2010 | Bear et al. ............ 707/685 |
| 2011/0016089 A1 | 1/2011 | Freedman et al. |
| 2011/0083088 A1 | 4/2011 | Cisler et al. |
| 2011/0083098 A1 | 4/2011 | Cisler et al. |
| 2011/0087976 A1 | 4/2011 | Cisler et al. |
| 2011/0202763 A1 | 8/2011 | Martin et al. |
| 2012/0124507 A1 | 5/2012 | Paterson et al. |
| 2012/0185438 A1 | 7/2012 | Giampaolo et al. |
| 2012/0185762 A1 | 7/2012 | Ozer et al. |
| 2012/0198383 A1 | 8/2012 | Cisler et al. |
| 2013/0066836 A1 | 3/2013 | Weiss et al. |
| 2013/0212599 A1 | 8/2013 | Giampaolo et al. |

FOREIGN PATENT DOCUMENTS

| | | |
|---|---|---|
| EP | 1582982 | 10/2005 |
| WO | 01/06356 | 1/2001 |
| WO | 02/101540 | 12/2002 |
| WO | 2005/045756 | 5/2005 |
| WO | 2008/019237 | 2/2008 |
| WO | 2008/019259 | 2/2008 |

OTHER PUBLICATIONS

Wang et al., "A Secure and Efficient Desktop Backup and Recovery System", 2007, IEEE, pp. 304-309.

"Apple Previews Mac OS X Leopard," Aug. 7, 2006, [Online] [Retrieved on Nov. 26, 2007] Retrieved from the Internet: URL:http://www.apple.com/pr/library/2006/aug/07leopard.html, pp. 1-2.

"Aulaclic: Unit 6. The Recycle Bin," Nov. 2005, [Online] [Retrieved on Nov. 26, 2007] Retrieved from the Internet: URL:http://www.teacherclick.com/winxp/t_6_1.htm, pp. 1-2.

Bonwick, "ZFS The Last Word in File Systems," [Online] [Retrieved on Jan. 22, 2008] Retrieved from the Internet: URL:http://opensolaris.org/os/community/zfs/docs/zfs.pdf, 34 pages.

Bonwick et al., "The Zettabyte File System," [Online] [Retrieved on Jan. 22, 2008] Retrieved from the Internet: URL:http://partneradvantage.sun.com/protected/solaris10/adoptionkit/tech/zfs/zfs_overview.pdf, 13 pages.

Bott, "Windows XP Backup Made Easy," [Online] [Retrieved on Jul. 7, 2009]; Retrieved from the Internet URL: http://www.microsoft.com/windowsxp/using/setup/learnmore/bott_03july14.mspx, 4 pages.

Engst, "Retrospect 6.0: Powerful Backup Program Adds Panther Compatibility and Enterprise Features," [Online] [Retrieved on Jul. 8, 2009]; Retrieved from the Internet URL: http://www.macworld.com/article/31038/2004/06/retrospect6x0.html, 8 pages.

Griffiths, "Leopard first looks: Time Machine," Aug. 8, 2006 [Online] [Retrieved on Nov. 23, 2007] Retrieved from the Internet: URL:http://www.macworld.com/2006/08/firstlooks/leotimemac/index.php?pf=1, pp. 1-2.

Harder, "Microsoft Windows XP System Restore," [Online] [Retrieved on Jul. 7, 2009] Retrieved from the Internet URL: http://msdn.microsoft.com/en-us/library/ms997627.aspx, 8 pages.

"How to Interpret Windows Installer Logs," [Online] [Retrieved on Dec. 12, 2009] Retrieved from the Internet URL: http://blogs.technet.com/richard_macdonald/archive/2007/04/02/How-to-Interpret-Windows-Installer-Logs.aspx; published Apr. 4, 2007; 6 pages.

In-nk files, The Open Group Base, Specifications Issue 6 [online]. IEEE Std 1003.1, 2004 Edition. [retrieved on Apr. 6, 2011]. Retrieved from the Internet:URL:http://pubs.opengroup.org/onlinepubs/009695399/utilities/In.html, 5 pages.

Microsoft-TechNet, "Using Encrypting File System," Nov. 3, 2005, Microsoft, 40 pages.

"MSDN Academic Alliance Developer Center, Curriculum Repository Glossary," [Online] [Retrieved on Apr. 22, 2009] Retrieved from the Internet URL: http://www.academicresourcecenter.net/curriculum/glossary.aspx, 4 pages.

Posey, Brien M., "Working with the Windows Server 2003 vol. Shadow Copy Service". Published Jun. 24, 2004. http://www.windowsnetworking.com/articles_tutorials/Windows-Server-2003-Volume-Shadow-Copy-Service.html.; 11 pages.

Rubel, "Easy Automated Snapshot-Style Backups with Rsync," [Online] [Retrieved on Nov. 8, 2010] Retrieved from the Internet URL: http://www.mikerubel.org/computers/rsync_snapshots; 18 pages.

"StorageSync: Backup, Restore, & Synchronization Software User's Guide", SimpleTech, 2003, 100 pages.

Sun Microsystems, Inc., "ZFS On-Disk Specification," Draft: Dec. 9, 2005, [Online] [Retrieved on Jan. 22, 2008]; Retrieved from the Internet URL: http://opensolaris.org/os/community/zfs/docs/ondiskformat0822.pdf 55 pages.

(56) References Cited

OTHER PUBLICATIONS

Tittel, "An EAZ Way to Restore Crippled and Inoperable Systems," ChannelWeb, Apr. 25, 2005, [Online] [Retrieved on Aug. 13, 2008] Retrieved from the Internet URL: http://www.crn.com/white-box/161502165, 10 pages.
"What's New in Word 2002," Wellesly College Information Services Computing Documentation, Jan. 2002, [Online] Retrieved on Aug. 14, 2008] Retrieved from the Internet URL: http://www.wellesley.edu/Computing/Office02/Word02/word02.html, 19 pages.
International Search Report and Written Opinion, PCT/US2007/074729, Jul. 12, 2007, 11 pages.
International Search Report and Written Opinion, PCT/US2007/074881, Jul. 12, 2007, 11 pages.
International Search Report and Written Opinion, PCT/US2007/074653, Aug. 14, 2008, 14 pages.
International Search Report and Written Opinion, PCT/US2008/065146, Oct. 31, 2008, 21 pages.
International Search Report and Written Opinion, PCT/US2008/066212, Mar. 9, 2009, 26 pages.
International Search Report and Written Opinion, PCT/US2007/074863 Apr. 21, 2009, 20 pages.
Communication pursuant to Article 94(3) EPC for Application No. EP 07 799 899.5, dated May 14, 2009, 2 pages.
Communication pursuant to Article 94(3) EPC for Application No. EP 07 799 899.5, dated Oct. 7, 2009, 4 pages.
Microsoft Technet: "Restore a previous version of a file," Jan. 21, 2005, [Online] [Retrieved on Oct. 20, 2011] Retrieved from the Internet URL: http://technet.microsoft.com/en-us/library/cc778220(d=printer,v=WS.10).aspx , pp. 1-2. (From 18962-0128EP1 OA dated Oct. 27, 2011).
Examination Report from European Application No. 07 813 605.8 dated Oct. 27, 2011, 5 pages.
Examination Report from European Application No. 07 813 540.7 dated Oct. 27, 2011, 5 pages.
Extended European Search Report, European Application No. 11184579.8, Nov. 17, 2011, 6 pages.
Office Action dated Feb. 29, 2012 from related Chinese Application No. 200880024710.0, 11 pages.
Godfrey, Michael et al., "Using Original Analysis to Detect Merging and Splitting of Source Code Entities," IEEE Transactions on Software Engineering, vol. 31, No. 2. Feb. 2005. pp. 166-181.
Microsoft Technet: "Restore a previous version of a file," Jan. 21, 2005, [Online] [Retrieved on Oct. 20, 2011] Retrieved from the Internet URL: http://technet.microsoft.com/en-us/library/cc778220(d=printer,v=WS.10).aspx , pp. 1-2.
Communication pursuant to Article 94(3) EPC for Application No. EP 07 813 540.7, dated Jun. 23, 2009, 2 pages.
Extended International Search Report and Written Opinion, EP 11171738.5, Aug. 29, 2011, 5 pages.
"Charles Rubin, Mary Millhollon and Katherine Murray," Microsoft Office Word 2003, Official Manual, First Edition, Japan, Nikkei BP Softpress, Jul. 12, 2004, vol. 1, p. 300, 815-818.
Microsoft Corporation, "Description of the AutoRecover Functions in Excel," [online] Microsoft Corporation, Aug. 10, 2007, Article ID 289273; URL: http://support.microsoft.com/kb/289273/en-us.
Office Action dated Apr. 1, 2015 from related Chinese Application No. 201310073409.1, 13 pages.

* cited by examiner

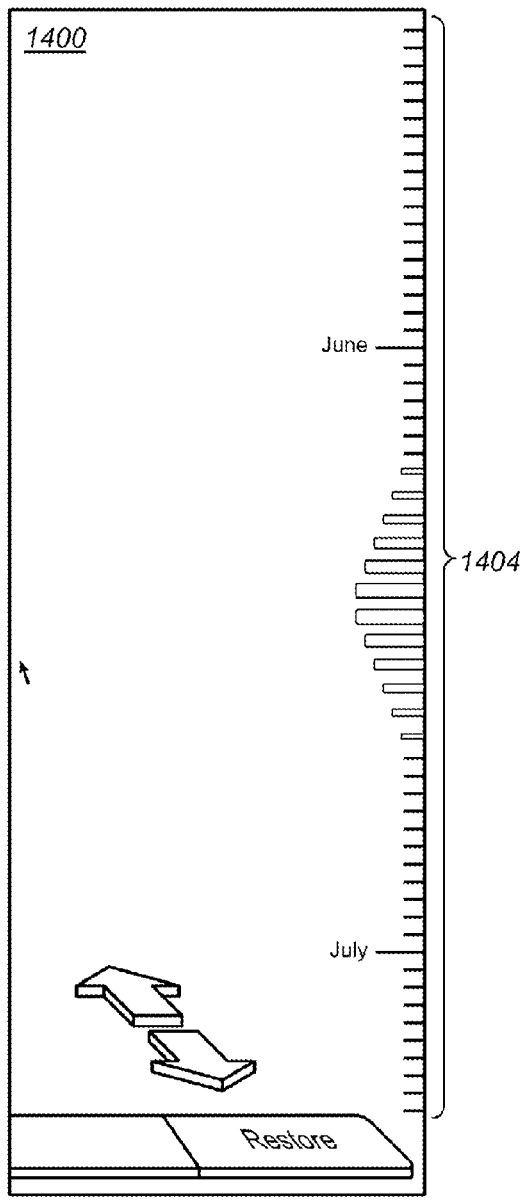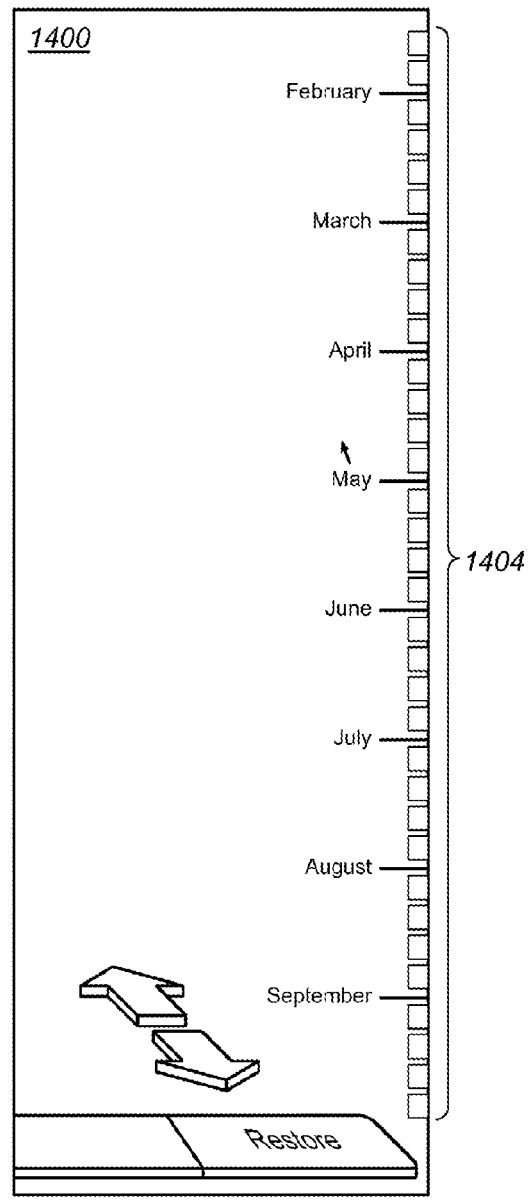
*FIG. 21*  *FIG. 22*

USER INTERFACE FOR ELECTRONIC BACKUP

CROSS-REFERENCE TO RELATED APPLICATIONS

This application is a continuation application of and claims priority to U.S. application Ser. No. 11/760,708, filed on Jun. 8, 2007. The disclosure of the foregoing application is incorporated herein by reference.

TECHNICAL FIELD

The disclosed implementations relate generally to storing and restoring digital data.

BACKGROUND

Modern graphical user interfaces allow a large number of graphical objects or items to be displayed on a display screen at the same time. Operating systems, such as Apple Mac OS®, provide user interfaces in which a number of windows can be displayed, overlapped, resized, moved, configured, and reformatted according to the needs of a user or a particular application. Taskbars, menus, virtual buttons and other user interface elements provide mechanisms for accessing and activating windows even when they are hidden behind other windows.

With the sophisticated tools available, users are encouraged not only to create and save a multitude of items in their computers, but also to revise or otherwise improve on them over time. For example, a user can work with a certain file and thereafter save its current version on a storage device. The next day, however, the user could have had second thoughts about the revisions, or could have come up with new ideas, and therefore opens the file again.

The revision process is usually straightforward if the user wants to add more material to the file or make changes to what is there. However, it is typically more difficult for a user to revert a file back to an earlier state if the user has changed his/her mind about modifications that were previously made. Application programs for word processing typically let the user "undo" previous edits of a text, at least up to a predefined number of past revisions. The undo feature also usually is configured so that the previously made revisions must be undone in reverse chronological order; that is, the user must first undo the most recently made edit, then the second-most recent one, and so on. If the user saves and closes the document and thereafter opens it again, it may not be possible to undo automatically any previous edits.

SUMMARY

Systems and methods are provided for storing and restoring digital data. In general, in one aspect, a method is provided. The method includes receiving, while a current view is displayed in a user interface, a first user input requesting that a backup interface be displayed, displaying the backup interface, the backup interface including a display area for presenting at least a first visual representation of an earlier version of the current view and a visual representation of the current view, the earlier version including a first element, receiving, while the backup interface is displayed, a second user input requesting that the current view be modified according to the earlier version, at least with regard to the first element, animating the modification of the first element as moving from the visual representation of the earlier version to the visual representation of the current view, and modifying, in response to the second user input, the current view according to the earlier version, at least with regard to the first element. Other embodiments of this aspect include corresponding systems, apparatus, computer program products, and computer readable media.

Implementations of the aspect can include one or more of the following features. Animating the modification can further includes lifting a copy of the first element from the visual representation of the earlier version, maintaining the position of the copy of the first element while animating the visual representations such that the visual representation of the earlier version falls away and the visual representation of the current view is presented, and adding the copy of the first element to the visual representation of the current view. The aspect can further include displaying the current view in the user interface, where the current view includes the modification of the first element.

In general, in one aspect, a method is provided. The method includes receiving, while a current view is displayed in a user interface, a first user input requesting that a backup interface be displayed and displaying the backup interface, the backup interface including a display area for presenting at least a first visual representation of an earlier version of the current view and a visual representation of the current view, the backup interface further including a timeline, where the timeline represents a plurality of visual representations of earlier versions of the current view. Other embodiments of this aspect include corresponding systems, apparatus, computer program products, and computer readable media.

Implementations of the aspect can include one or more of the following features. Displaying the backup interface can include displaying a timeline including a vertical column of tick marks. The timeline can be a condensed timeline that includes a plurality of condensed tick marks, where each condensed tick mark represents multiple individual tick marks. The timeline can animate in response to a user input. The animation can be based on a cursor position.

The animation can further include determining an identified tick mark, the identified tick mark having a shortest distance from a cursor position and expanding the timeline to display individual tick marks relative to the identified tick mark. Displaying the individual tick marks can include magnifying the identified tick mark. A date can be displayed corresponding to the earlier version of the current view represented by the identified tick mark.

The aspect can further include determining that the cursor position has moved, determining a next identified tick mark relative to the cursor position, and magnifying the next identified tick mark. The aspect can further include receiving an input selecting the identified tick mark, displaying the visual representation of an earlier version of the current view corresponding to the identified tick mark, and compressing the timeline to the condensed timeline.

In general, in one aspect, a method is provided. The method includes displaying a backup interface in a user interface, the backup interface including a display area for presenting a plurality of visual representations of an earlier version of the current view and a visual representation of the current view, and displaying a timeline, the timeline including a series of steps and including one or more compressed portions and an expanded portion where each step in a compressed portion is associated with one or more earlier versions of the current view, and each step in an expanded portion is associated with only a single earlier version of the current view or the current view. Other embodiments of this aspect include corresponding systems, apparatus, computer program products, and computer readable media.

Implementations of the aspect can include one or more of the following features. Each step can have a visible representation in the timeline and includes a tick mark. A tick mark associated with a compressed portion of the time line can be larger than a tick mark associated with an expanded portion of the timeline.

Particular embodiments of the subject matter described in this specification can be implemented to realize one or more of the following advantages. Users can focus in and identify particular snapshots from a timeline of tick marks representing one or more snapshots. A restoration animation provides users with visual cues to the restoration of an item from a history view.

The details of the various aspects of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIGS. 14-23 are screenshots depicting an example timeline animation.

DETAILED DESCRIPTION

Figure 1:
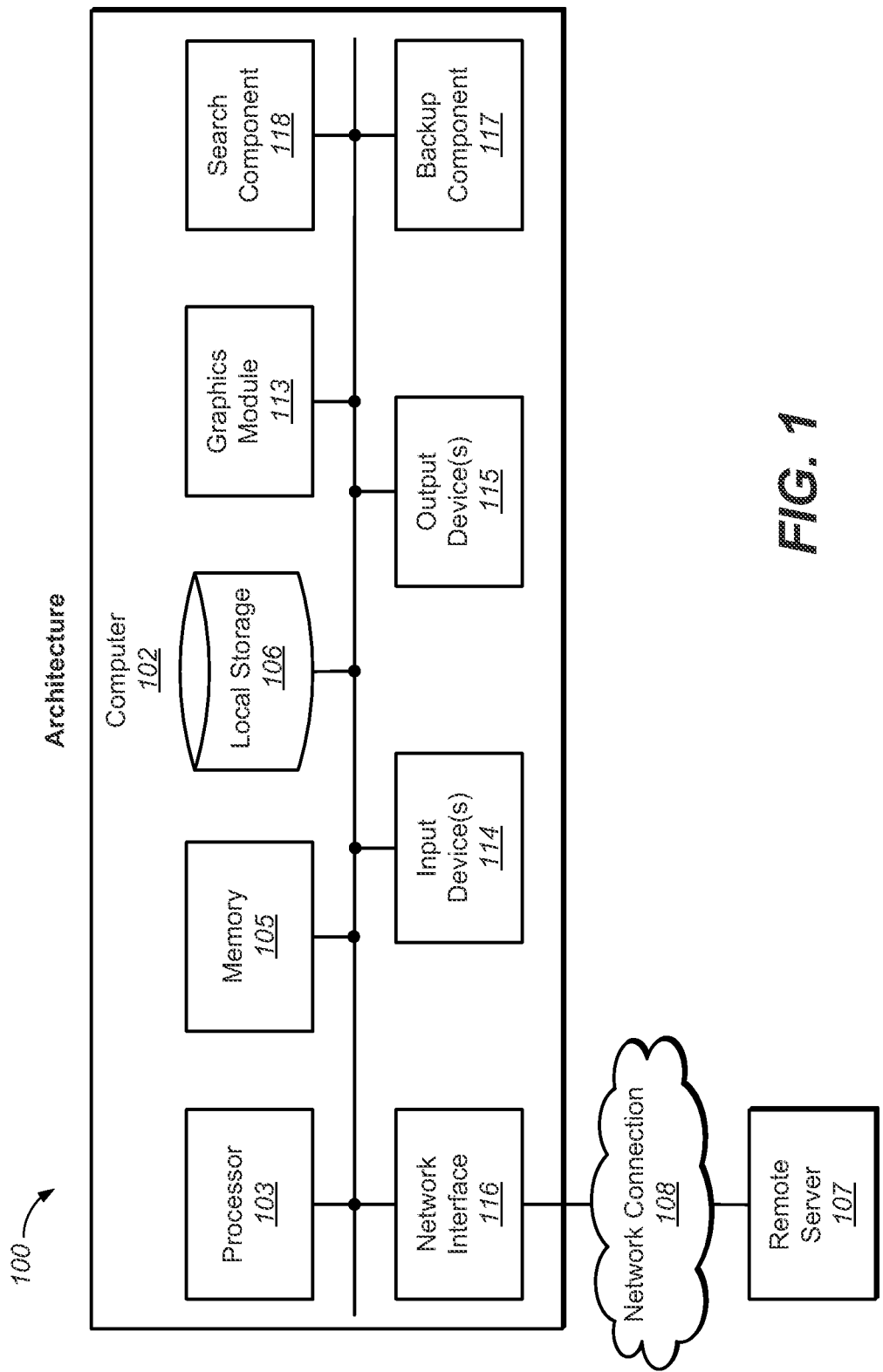
FIG. 1 is a block diagram of an example system.

FIG. 1 is a block diagram of a system 100. The system 100 can allow a user to search a captured version of an interface view, perhaps to initiate a restoration based on it. As used herein, a view refers to an item, element, or other content, capable of being stored and/or retrieved in an interface, which can be subjected to a backup operation by a backup component 117. For example, a user interface view can contain any number of icons, files, folders, application state information and/or machine state information, preferences, etc.

The system 100 includes a personal computer 102 communicatively coupled to a remote server 107 via a network interface 116 and a network 108 (e.g., local area network, wireless network, Internet, intranet, etc.). The computer 102 generally includes a processor 103, memory 105, one or more input devices 114 (e.g., keyboard, mouse, etc.), and one or more output devices 115 (e.g., a display device). A user interacts with the system 100 via the input and output devices 114, 115. The system 100 includes various hardware elements. The system 100 can include hardware, software, and combinations of the two.

The computer 102 also includes a local storage device 106 and a graphics module 113 (e.g., a graphics card) for storing information and generating graphical objects, respectively. The local storage device 106 can be a computer-readable medium. The term "computer-readable medium" refers to any medium that includes data and/or participates in providing instructions to a processor for execution, including without limitation, a machine-readable storage device such as non-volatile media (e.g., optical or magnetic disks) and volatile media (e.g., memory). The computer-readable medium also includes transmission media. Transmission media includes, without limitation, coaxial cables, copper wire, fiber optics, and computer buses. Transmission media can also take the form of acoustic, light or radio frequency waves.

While modifications of a user interface view are described herein with respect to a personal computer 102, it should be apparent that the disclosed implementations can be incorporated in, or integrated with, any electronic device that has a user interface, including without limitation, portable and desktop computers, servers, electronics, media players, game devices, mobile phones, email devices, personal digital assistants (PDAs), embedded devices, televisions, other consumer electronic devices, etc.

Systems and methods are provided for searching stored contents that correspond to earlier versions of system information, application information, or system, application, or user interface state. The systems and methods can be stand-alone or otherwise integrated into a more comprehensive application. In the materials presented below, integrated systems and methods are provided for viewing and modifying an interface view (e.g., a user interface view).

Though discussion is made with reference to modifying a user interface view, those of ordinary skill will recognize that such a view can be based on various data structures, files, processes, and other aspects of information management. It follows that modification to file structures, data and the like is also contemplated in order to achieve the modification to the user interface view. In other words, while the restoration of the user interface view from one state to another can be the most apparent change from the user's perspective, this is accomplished through the corresponding changes in the underlying system content.

One of ordinary skill in the art will recognize that the engines, methods, processes and the like that are described can themselves be an individual process or application, part of an operating system, a plug-in, an application, or the like. In one implementation, the system and methods can be implemented as one or more plug-ins that are installed and run on the personal computer 102. The plug-ins are configured to interact with an operating system (e.g., MAC OS® X, WINDOWS XP, LINUX, etc.) and to perform the various functions, as described below.

A system and method for modifying a user interface view can also be implemented as one or more software applications running on the computer 102. Such a system and method can be characterized as a framework or model that can be implemented on various platforms and/or networks (e.g., client/server networks, wireless networks, stand-alone computers, portable electronic devices, mobile phones, etc.), and/or embedded or bundled with one or more software applications (e.g., email, media player, browser, etc.).

The computer 102 includes the backup component 117 that allows for the storage of versions of the computer's files or other items (e.g., restoring a view including past state of a file, application, application data, parameters, settings, and the like), for example within the local storage 106 or in an external storage repository. In one implementation, the backup component 117 also allows a user to select any of the stored versions and use it to initiate a restoration of backup data corresponding to that version in the computer 102.

In some implementations, the computer 102 can include a search component 118 that allows for searches of the computer's files or other items, for example within the local storage 106 or an external storage repository. In one implementation, the search component 118 can interact with the backup component 117 to perform searches of stored versions of the computer's files and other items. Particularly, in one implementation, the search component 118 provides that a user can select search results identified in an earlier version and use them to initiate a restoration of that version in the computer 102. This means that when a user searches for a file but the file is not found, the user can invoke the backup component 117 (or a portion thereof) to show one or more previous states of, for example, the C: drive or some other system resource. For example, if the user is looking for content of the C: drive (that does not currently hold the sought file), the user (or the computer) can launch a backup component to look at previous states of the C: drive to see if the file has been archived. This operation can be facilitated by the search environment forwarding information (e.g., an identity of the sought file) to the backup environment for showing the correct archive(s).

Figure 2:
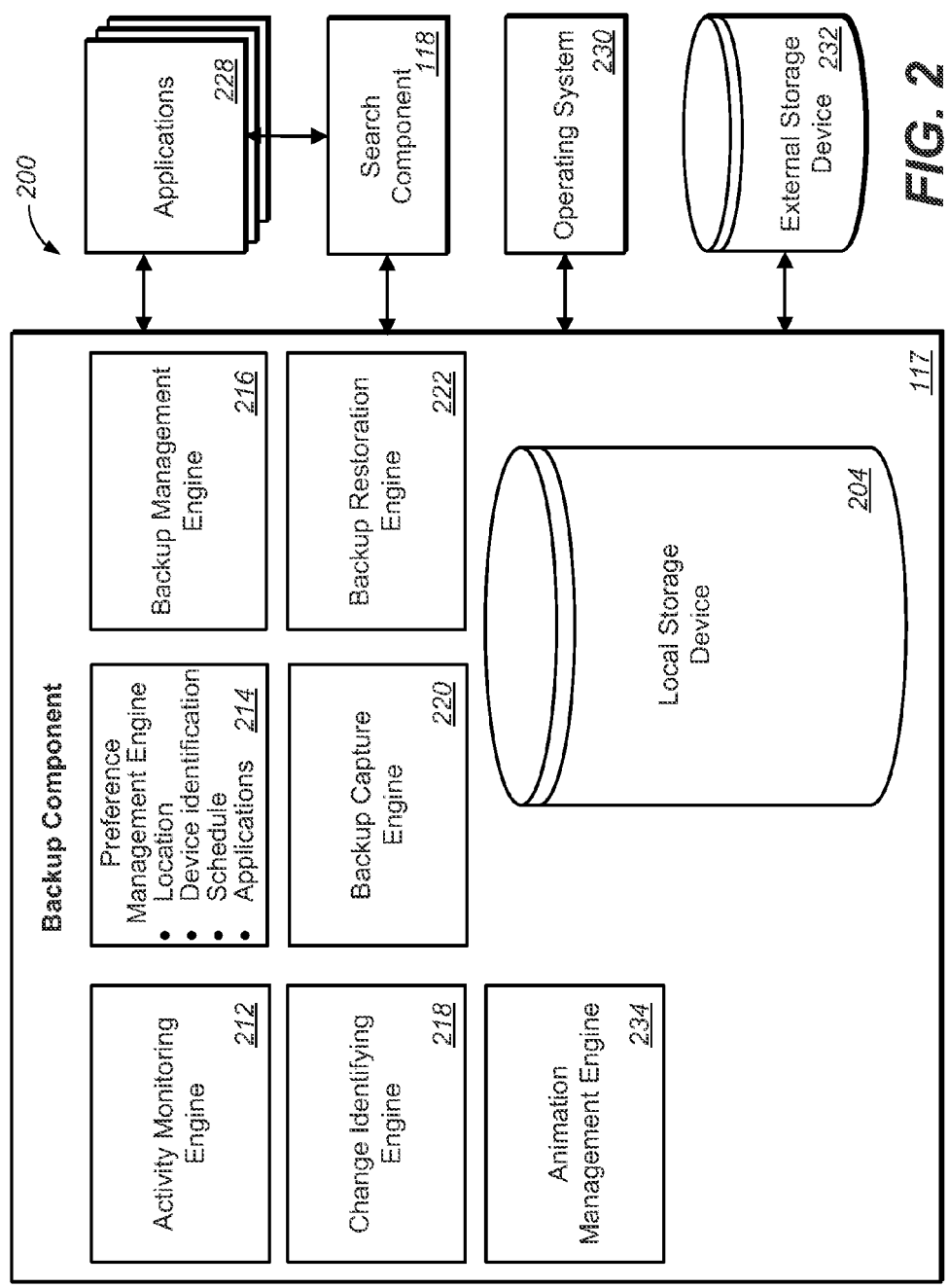
FIG. 2 is a block diagram of an example architecture for the back up and restoration of data.

FIG. 2 is a block diagram of an example architecture 200 for the back up and restoration of data. The data can include, e.g., application files, application data, settings, parameters or the like, such as those associated with a set of applications 228. The backup component 117 provides back up and restoration capability for the system 100. Many different items or elements can be the subject of a backup operation in the system 100. For example, folders, files, items, information portions, directories, images, system parameters, playlists, address books, e-mails, e-mail folders, a state of an application or state of the system, preferences (e.g., user or system preferences), and the like all can be candidates for archiving. Other types of data can be included in backup operations.

In this example, the backup component 117 includes a local storage device 204 and an external storage device 232. Backup data can be stored on either. Any number of local and/or external storage devices can be used by the backup component 117 for storing backup data corresponding to the versions. In one implementation, no local storage is provided. In one implementation, the backup component 117 stores the backup data in a format corresponding to a file system structure.

In one implementation, one copy of original data (e.g., folders, files, items, information portions, directories, images, system parameters, playlists, address books, e-mails, e-mail folders, application states, preferences, and the like) is stored in the system as backup data (e.g., an original version of the data). When one or more subsequent sets of backup data, or versions, of the data are generated through subsequent backup operations, the backup data can contain only the differences between a current data version and the prior backup data, thereby saving storage space. In some implementations, the storage devices 204 and 232 can be used to store the original backup data as well as links pointing to the original backup data. The links can be hard links which reference, or point to, physical data, or as another example can be symbolic links that reference another file on the storage device (e.g., by name or location).

In one implementation, the backup component 117 runs as a background task on an operating system 230, where the task is generally not visible to the user. The backup component 117 can be configured to run across multiple user accounts. In another implementation, the backup component 117 runs within an application 228 in the user space.

The backup component 117 includes an activity monitoring engine 212. In one implementation, the activity monitoring engine 212 monitors for changes within an application view (e.g., application files or state) that are targeted for inclusion in backup operations. A change can also include the addition of new files or data (e.g., files or other data structures) or deletion of the same.

In one implementation, the activity monitoring engine 212 is capable of discerning between a substantive change (e.g. the text within a document has been modified) and a non-substantive change (e.g. the play count within an iTunes playlist has been updated, or several changes cancel each other out) through its interaction with the applications 228. The activity monitoring engine 212 can create, for example, a list of modified elements (e.g., files) to be used when a backup operation is eventually triggered. In one implementation, the activity monitoring engine 212 can monitor the system for periods of inactivity. The activity monitoring engine 212 can then trigger a backup operation during a period of time in which the backup operation will not cause a system slowdown for an active user.

A preference management engine 214 specifies some operating parameters of the backup component 117. In one implementation, preference management engine 214 contains user-specified and/or system default application parameters for the backup component 117. These can include settings for the details of capturing and storing the views. For example, the preference management engine 214 can determine the frequency of the backup operations, the storage location for the backup data, the types of elements (e.g. files or other items) that are eligible for inclusion in backup operations, and the events which trigger a backup operation (periodic or event-driven, etc.).

In one implementation, the preference management engine 214 can detect when a new storage device is being added to the system and prompt the user to specify whether it should be included as a backup repository. Files and other items can be scheduled for a backup operation based on location (e.g. everything on lettered drives such as C: drive and within D:/photos, or named drives such as "MyBigDisk" drive or within named directories such as within "/ExtraStorage/Photos", thus reference in this specification to drives is not limited to lettered drives or paths), a correlation with specific applications (e.g. all pictures, music, e-mail in an inbox, an address book and system settings), or a combination of strategies. Different types of items can be scheduled to be stored on different devices or on different segments of a storage device during a backup operation.

A backup management engine 216 coordinates the collection, storage, and retrieval of views performed by the backup component 117. For example, the backup management engine 216 can trigger the activity monitoring engine 212 to watch for activities that satisfy a requirement specified in the preference management engine 214 for initiating a backup operation.

A change identifying engine 218 locates specific elements (e.g., monitored files or other items within) the system 200 to determine if they have changed. The change identifying engine 218 can be capable of discerning a substantive change from a non-substantive change, similar to the example described above for the activity monitoring engine 212. In one implementation, the change identifying engine 218 traverses a target set of elements (e.g., files, data, or other items), comparing a previous version to the current version to determine whether or not a modification has occurred.

A backup capture engine 220 locates views (e.g., elements, files, data, or other items) that are to be included in a backup. The backup capture engine 220 can invoke the activity monitoring engine 212 and/or the change identifying engine 218, for example, to generate a capture list identifying data to be included in a next backup operation. The backup capture engine 220 can then store copies of the listed data in one or more targeted storage repositories. The backup capture engine 220 can track multiple versions of the data included in the backup repository.

The backup component 117 includes a backup restoration engine 222 to restore previous versions of views (e.g., files, data, or other items). In one implementation, the backup restoration engine 222 provides a user interface (e.g., a graphical user interface) where a user can select the item(s) to be restored.

The backup component 117 includes an animation management engine 234. The animation management engine 234 performs or otherwise manages animations occurring within a user interface generated by the backup component 117. For example, the animation management engine 234 can animate a timeline of captured earlier versions stored by the backup component 117. Such animation can give an overview of the archive data that is available and can help a user in choosing a particular backup version to restore.

The search component 118 can search directly within the one or more applications 228 for a current state or version of the files or other items. In addition, the search component 118 can search earlier versions of the files and other items using the backup component 117. For example, the search component 118 can provide a search interface within a backup user interface that allows searches of earlier versions of the files or other items. In addition, the search component 118 can provide a search interface within a user interface (e.g., a desktop user interface) that allows searches of the current version of the files or other items.

For example, the search component 118 can be used to initiate a search to find a particular item or element, such as an image file. If this search finds the sought item, and if the item meets the user's expectations, there may be no need to do any further searching at that time. However, if the search does not find the sought item, or if the item that is found does not meet the user's expectations, the user can choose to perform a search of historical views. The user can activate the backup user interface to search the historical views.

Figure 3:
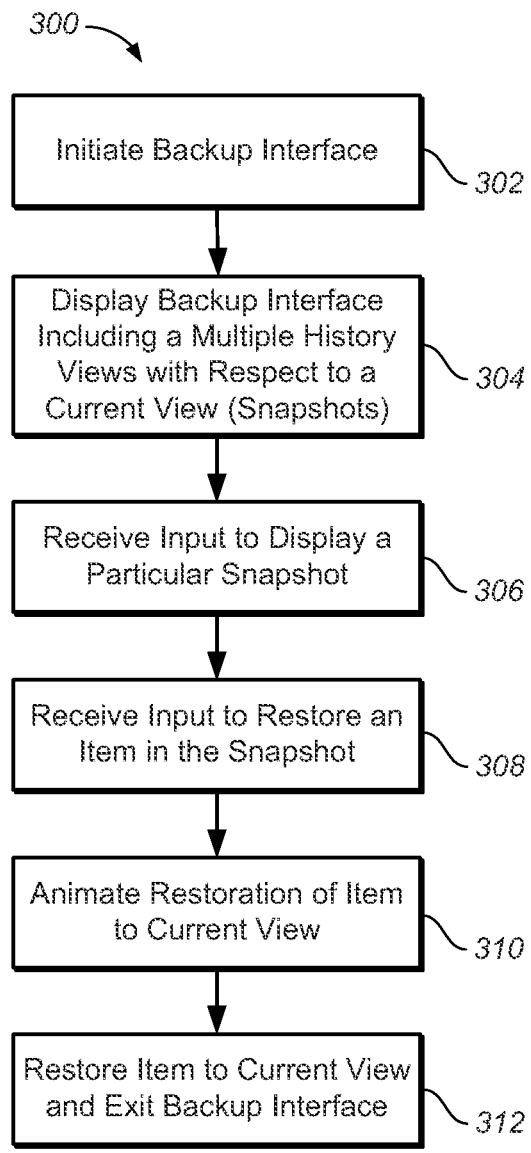
FIG. 3 is a flow chart of an example method for restoring an item in a backup interface.

FIG. 3 is a flow chart of an example method 300 for restoring an item in a backup interface. For convenience, the method 300 will be described with respect to a system (e.g., system 100) performing the method 300. The system initiates (302) a backup interface. In some implementations, a user can initiate a backup interface from a user interface (e.g., a desktop user interface). For example, a backup interface icon can be provided in the user interface (e.g., by the backup component 117). Alternatively, the backup component can initiate the backup interface in response to a user selected menu item. For example, using a drop down menu in the user interface.

In some implementations, the desktop user interface includes one or more windows. The windows can provide, for example, a current view of an open application (e.g., a user interface of the current application state) or a current view of a navigation interface (e.g., for navigating a file system, for example, of local storage 106). The user can initiate the backup interface within an active window of the user interface, e.g., from a particular application or navigation interface.

A backup interface icon or menu option can allow a user to enter the backup interface with respect to the active window. For example, a user can enter the backup interface from a navigation interface providing a particular view of the file system in order to search for a missing or earlier version of an item (e.g., a file or folder).

The system displays (304) the backup interface. The backup interface can include multiple history views with respect to the current view. The history views can be visual representations of the backup data presented in the history view. In some implementations, the history views are presented as snapshots. A snapshot, as used herein, can refer to a backup element stored in an archive that includes a backup of selected items or content as specified by the backup component 117. A snapshot can also represent the current view in the backup interface. In some implementations, the snapshots are arranged in a cascading stack, where each next snapshot moving through the stack corresponds to a point in time further in the past relative to the current view (e.g., presented at the top of the stack).

For example, if the user activated the backup interface from an interface of a particular application, each snapshot can provide a visual representation of the application's user interface corresponding to the state when the corresponding backup occurred. Similarly, if the user activated the backup interface from a particular point in the file system using the navigation interface, the snapshots can provide representations of the navigation interface at particular points in time. As a result, the user can visually identify items in snapshots for restoration or restore an entire state (e.g., of an application) represented by the snapshot.

The system receives (306) an input to display a particular snapshot. The user can navigate between snapshots in the backup interface. For example, the user can use navigation buttons (e.g., arrow buttons) to move forward or backward though the snapshots. Alternatively, the user can select a particular snapshot directly in the stack using, for example, an input device (e.g., a mouse) to move a cursor to a particular snapshot and then select the snapshot. In other implementations, the snapshots can be represented in other ways, for example, as a timeline of tick marks within the backup interface. The user can select a particular tick mark to select a specific snapshot (as described in greater detail below). When the user selects a particular snapshot, the selected snapshot is presented as a current snapshot at the top of the stack of snapshots.

The system receives (308) an input to restore an item in the particular displayed snapshot. For example, a user can enter the backup interface from a navigation interface in order to restore an earlier version of a particular file. Once the user identifies the particular earlier version of the file in a selected snapshot (e.g., corresponding to an earlier time prior to some edits to the file that the user wishes to undo), the user can select the file for restoration. Similarly, the user can select other aspects in the snapshot, for example, presented application data (e.g., mail messages in snapshots of an e-mail application interface, songs from a music management application) as well as state information for a collection of data represented by the snapshot (e.g., a state of an application).

The user can select the file, for example, by selecting the file in the snapshot with an input device. The selected item can be identified, for example, by highlighting the item in the snapshot. The user can then select a restore control to activate a restoration process for the selected file.

In some implementations, the system animates (310) a restoration of the selected item to the current view. For example, the system can animate the item by lifting a copy of the item off of the selected snapshot and transporting the item forward in time to the snapshot representing the current state. One example animation is described with respect to FIGS. 4-12 below.

The system restores (312) the item to a current view and exits the backup interface. For example, if the restored item exists in the current view (e.g., when restoring an earlier version of the item), the restored item can replace the existing item in the current view (e.g., the exiting item is deleted and replaced with the restored item). Alternatively, the restored item can be separately saved (e.g., under a different filename). Alternatively, if the item does not exist in the current view (e.g., restoring an item that was deleted from the current view), then the copy of the restored item can simply be copied, e.g., to a location corresponding to the current view.

FIGS. 4-12 are screenshots depicting an example restoration animation using a backup interface.

Figure 4:
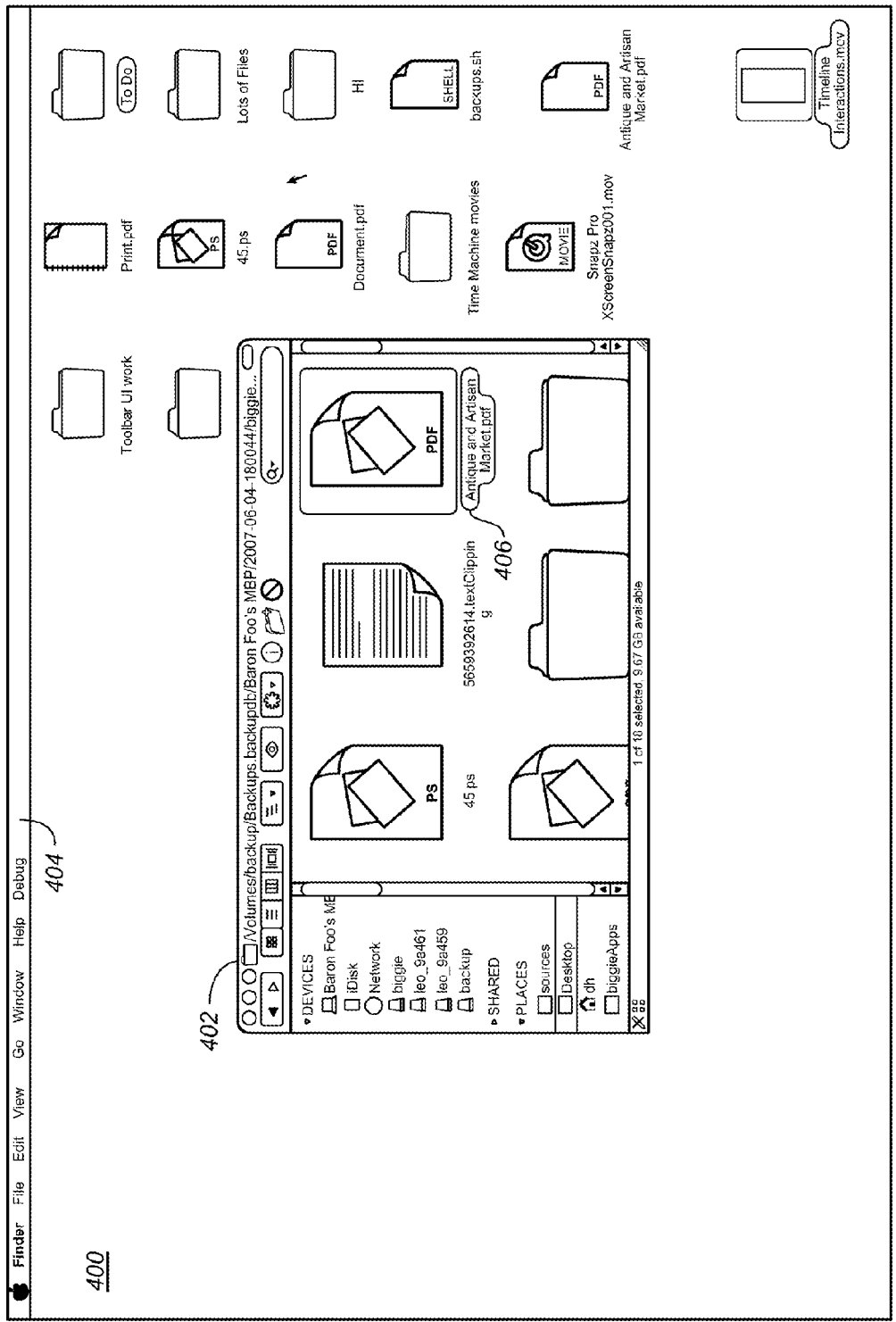
FIGS. 4-12 are screenshots depicting an example restoration animation using a backup interface.

FIG. 4 shows an example user interface 400 prior to entering a backup interface. The user interface 400 can include a number of windows representing, for example, active applications or open navigation interfaces. In this example, a current view of a navigation interface 402 is displayed in a window in the user interface 400. In particular, the navigation interface 402 shows a view of a portion of a file system including a navigable hierarchy in a navigation pane and a list of items in a display pane, respectively. The listed items can be files, folders, or other items associated with the particularly selected portion of the file system hierarchy. The display pane includes, for example, file 406. File 406 can be a current version of a file where, for example, the user wishes to restore an earlier version. Alternatively, the user could enter the backup interface from the user interface 400 to search for an item was missing from the navigation interface 402.

With the navigation interface 400 as the active window, the user can launch the backup user interface by, for example, selecting a backup option from a menu 404 of the user interface 400 or using an icon or menu item associated with the navigation interface 402.

Figure 5:
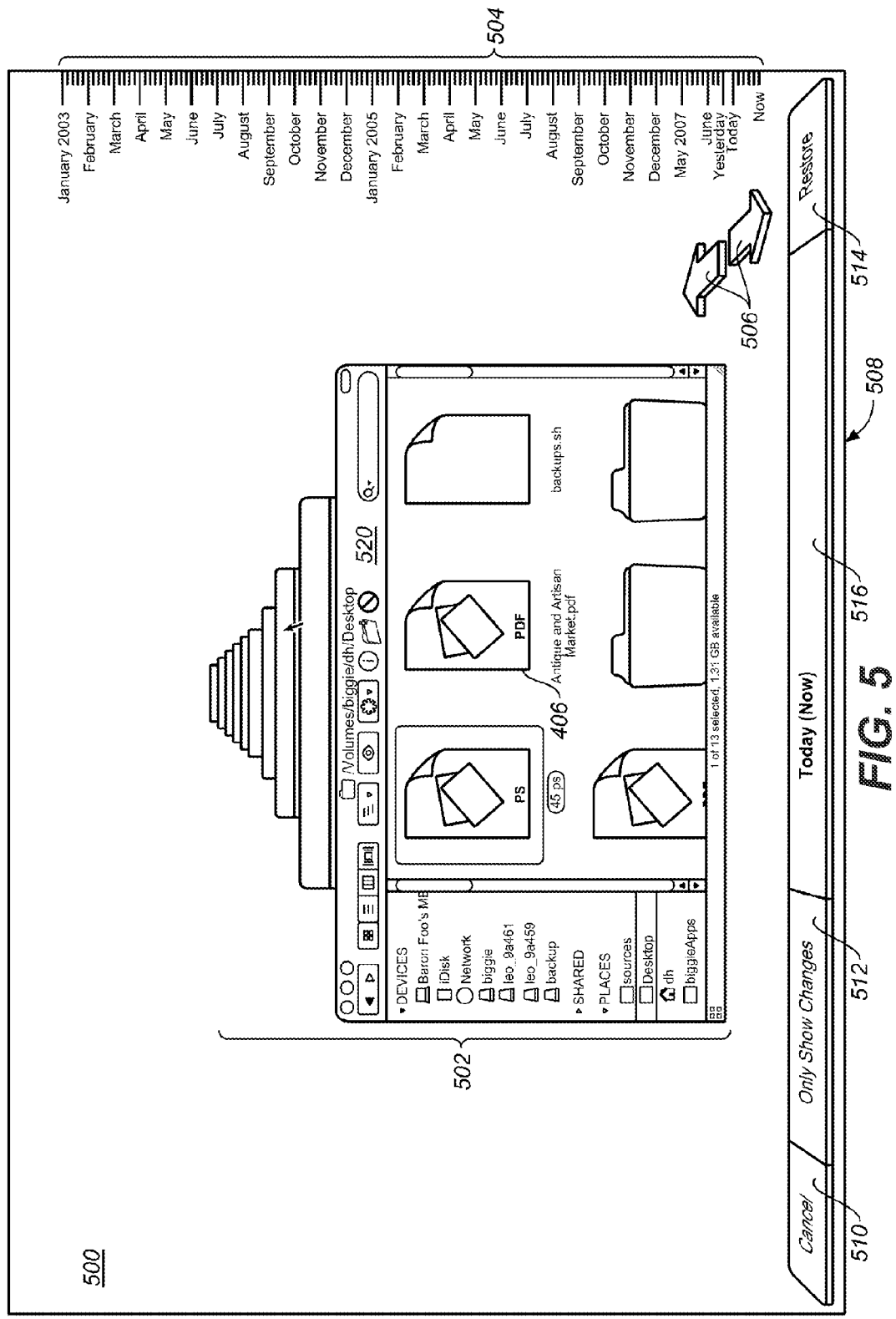

FIG. 5 shows an example backup interface 500. The backup user interface includes snapshots 502, timeline 504, navigation controls 506a-b, and a control bar 508 including, for example, a "cancel" control 510, an "only show changes" control 512, and a "restore" control 514. The control bar 508 can also include a date display 516, which displays the date of the topmost snapshot of snapshots 502.

The "cancel" control 510 can allow the user to cancel the restoration of one or more files or items. In some implementations, canceling a restoration will also lead to exiting the backup interface and returning, for example, to the user interface 400 of FIG. 4. The "restore" control 514 can allow a user to restore a selected item in a snapshot to the current view (e.g., to the current view of the file system).

In some implementations, the "restore" control 514 can be used to restore the entire contents of the selected snapshot e.g., restore the current file system state with all the files or items in a currently selected snapshot. The "only show changes" control 512 can allow a user to select whether or not snapshots without changed items will be presented in the backup interface. In some implementations, the "only show changes" control 512 can be toggled to display a "show all" control.

In FIG. 5, the current snapshot 520 (e.g., the topmost snapshot) represents the current view of the navigation interface 402. Thus, the date display 516 displays the date of the snapshot as "Today (Now)". Additionally, the contents of the current snapshot 520 correspond to the contents presented in the navigation interface 402, in particular, the snapshot 520 includes the item 406.

Figure 6:
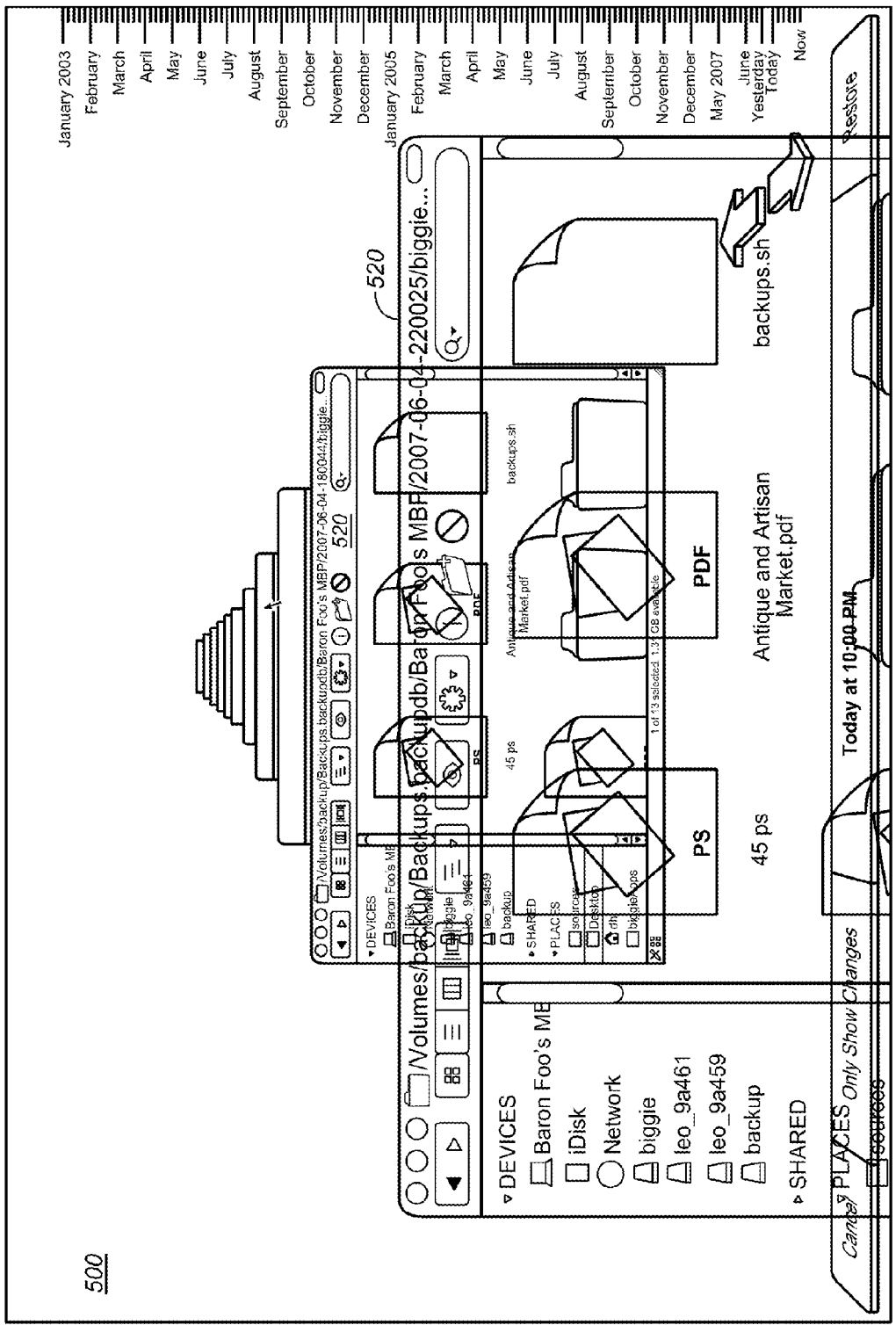

FIG. 6 shows an animation of the backup interface 500 when a user selects a particular snapshot. The user can select a particular snapshot, e.g., in the stack of snapshots 502. The backup interface can animate the snapshots 502 such that they appear to move forward to display the selected snapshot as the current snapshot (displayed on top of the stack). For example, the user can navigate to snapshots using the navigation controls 506a-b. Alternatively, the user can select a snapshot directly by selecting from the snapshots 502 or the timeline 504.

During the animation, snapshots between the current snapshot and selected snapshot can appear to move forward and dissolve in sequence. Thus, as shown in FIG. 6, the current snapshot 520 is shown as partially transparent as it moves forward. The current snapshot 520 is also shown larger to appear closer in space. In some implementations, the animated snapshots move in front of the control bar 508 and navigation buttons 506.

Figure 7:
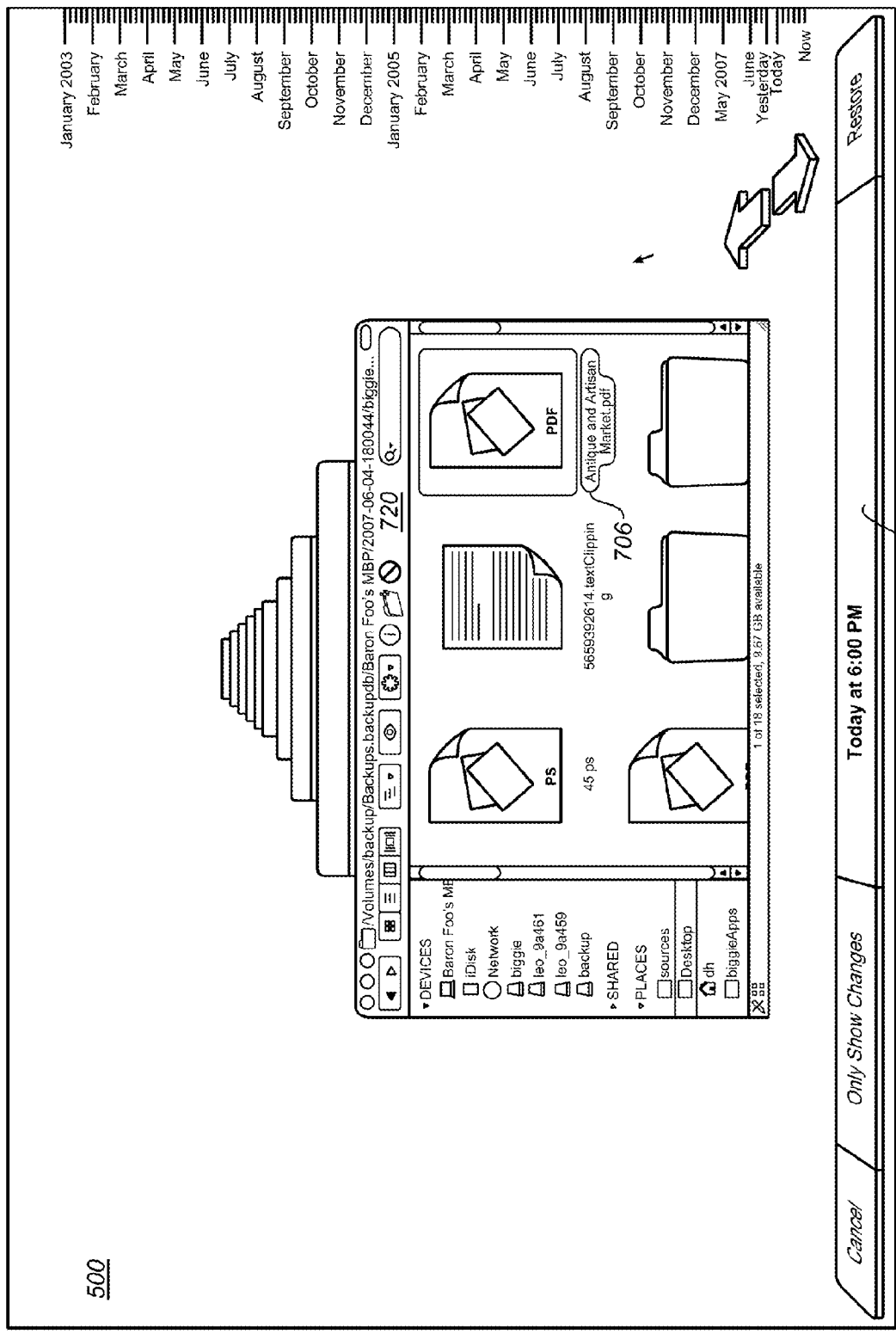

FIG. 7 shows the backup interface 500 with the selected snapshot as the current snapshot 720. The current snapshot 720 represents a history view taken on the current day, but at 6:00 PM, as shown in the date display 516. The selected snapshot includes particular contents associated with the navigation interface, including item 706. The item 706 represents an earlier version of the item 406 of the current state of the navigation interface 402 shown in FIG. 4. The item 706 is shown as selected by the user (e.g., highlighted).

Figure 8:
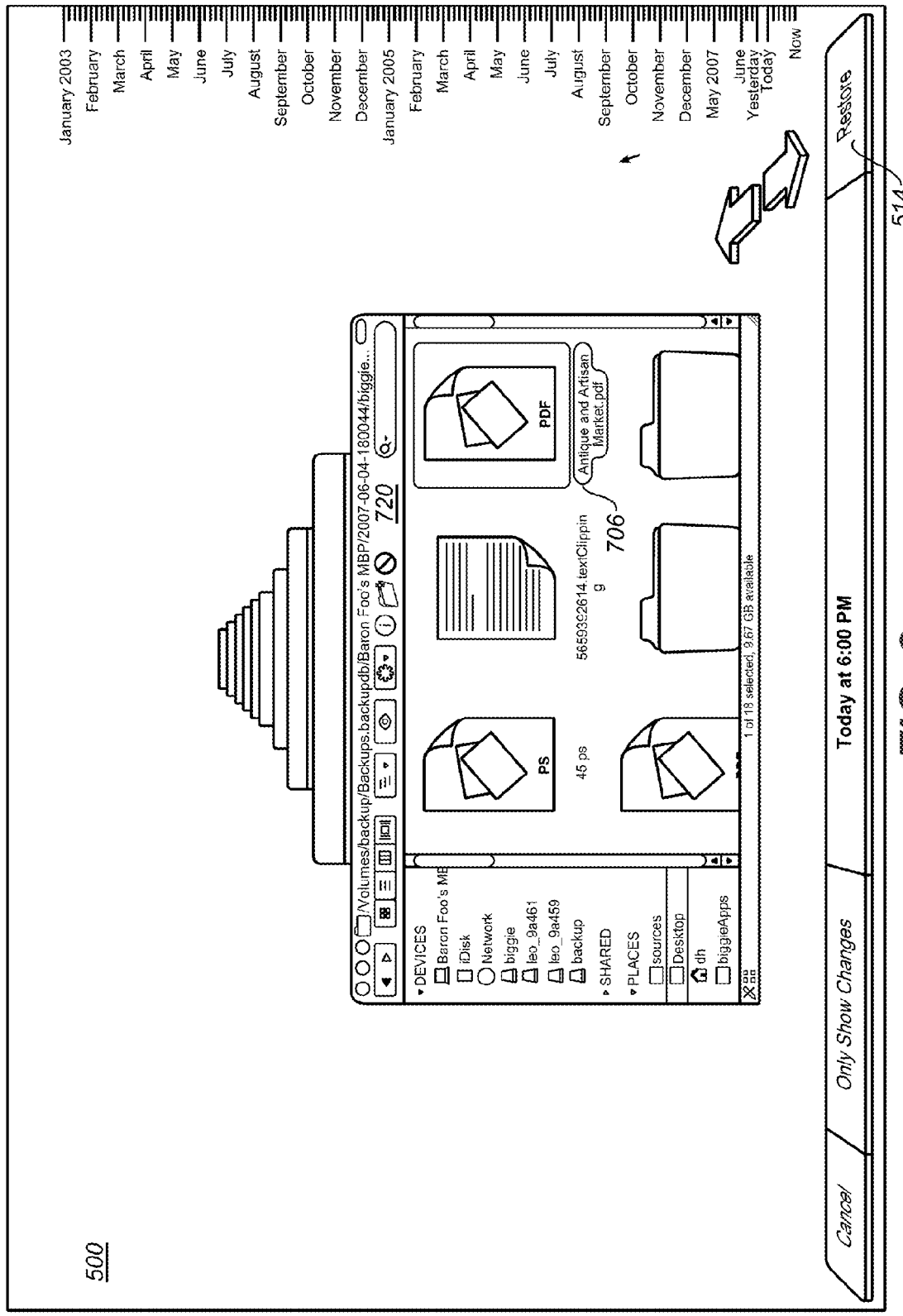

FIG. 8 shows the backup interface 500 as the user initiates a restore of the item 706 to the current view. The user has selected the "restore" control 514, now shown as highlighted.

Figure 9:
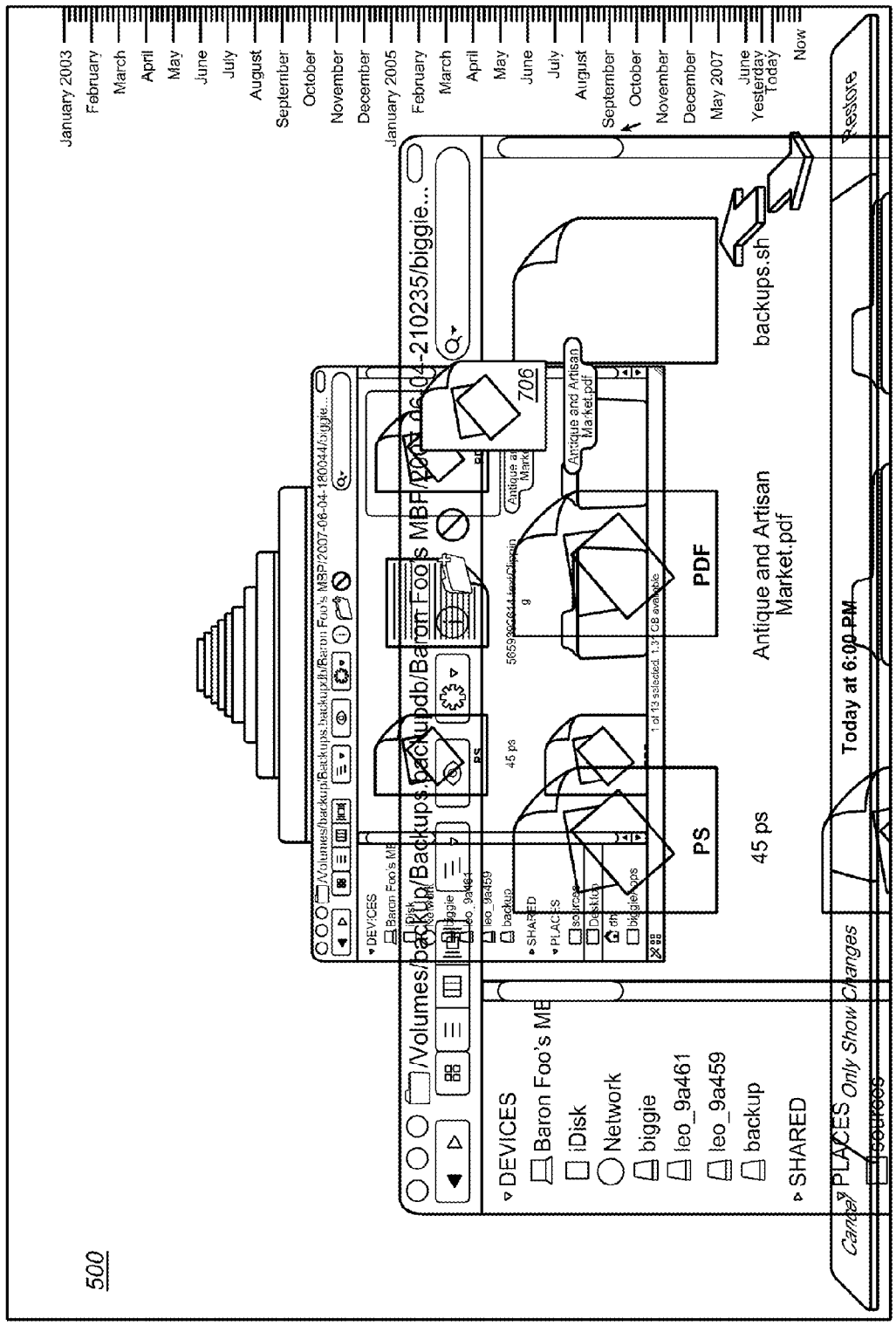

FIG. 9 shows the backup interface 500 during an animation of the item 706 while restoring the item 706. In the animation of the item 706, a copy of the item 706 appears to lift away from the snapshot 720. The snapshots 702 animate backward to the snapshot representing the current view. While the snapshots 702 animate backward, the item 706 appears to remain in place. Consequently, the item 706 appears to move forward through the snapshots 702 to the current view.

Figure 10:
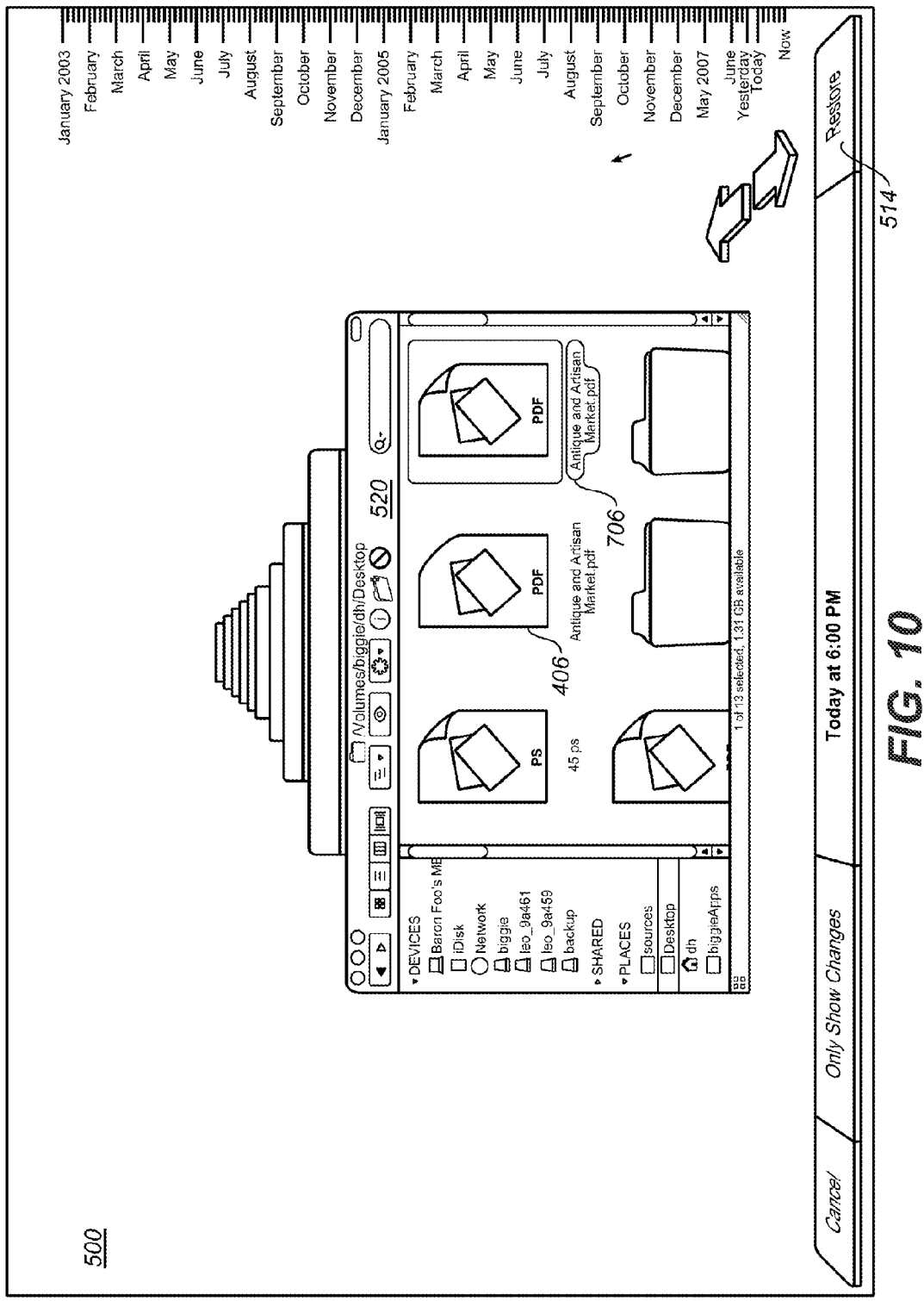
Figure 11:
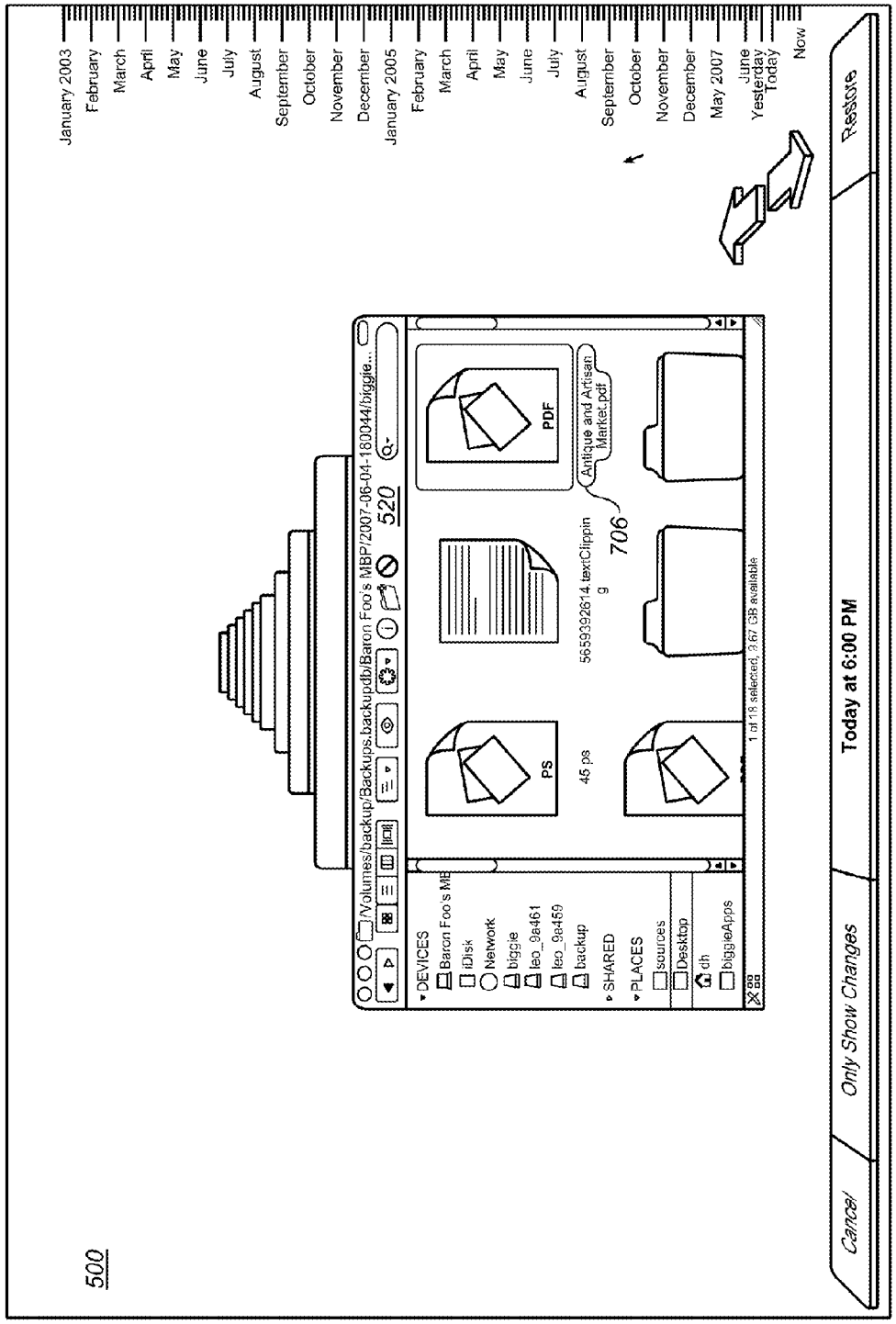

FIG. 10 shows the backup interface 500 where the item 706 has been placed in the snapshot 520 representing the current view. Also shown in the snapshot 706 is the current version of the item 406. As shown in FIG. 11, the item 706 has replaced the current version of the item 406 indicating that the item 706 has been restored to the current view, replacing the item 406. Once the item 706 has been restored to the current view, the backup interface 500 exits.

Figure 12:
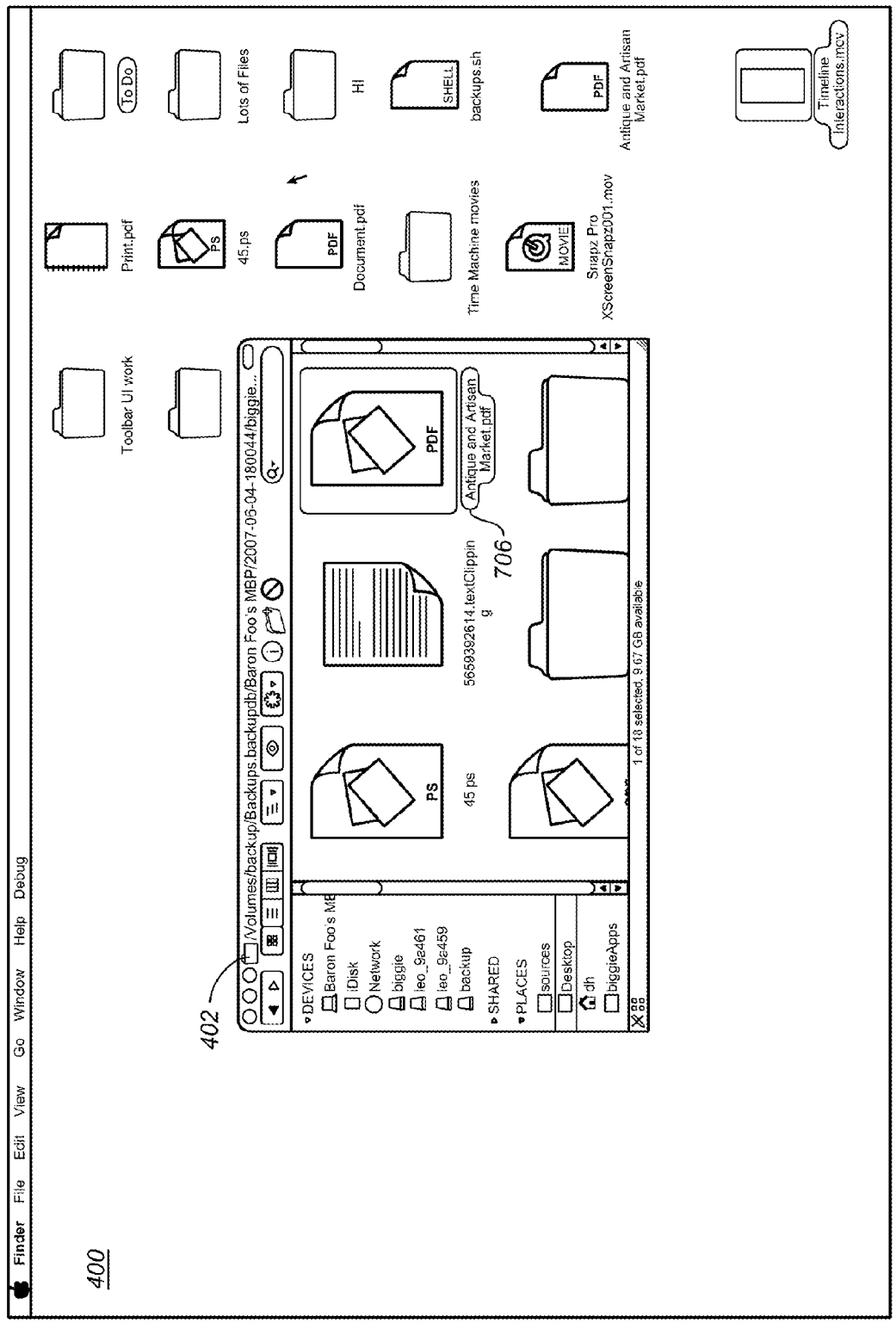

FIG. 12 shows the user interface 400 after the backup interface 500 exits. The user interface 400 again shows the navigation interface 402, however, the item 406 has now been replaced with the item 706, which was restored by the backup component.

Figure 13:
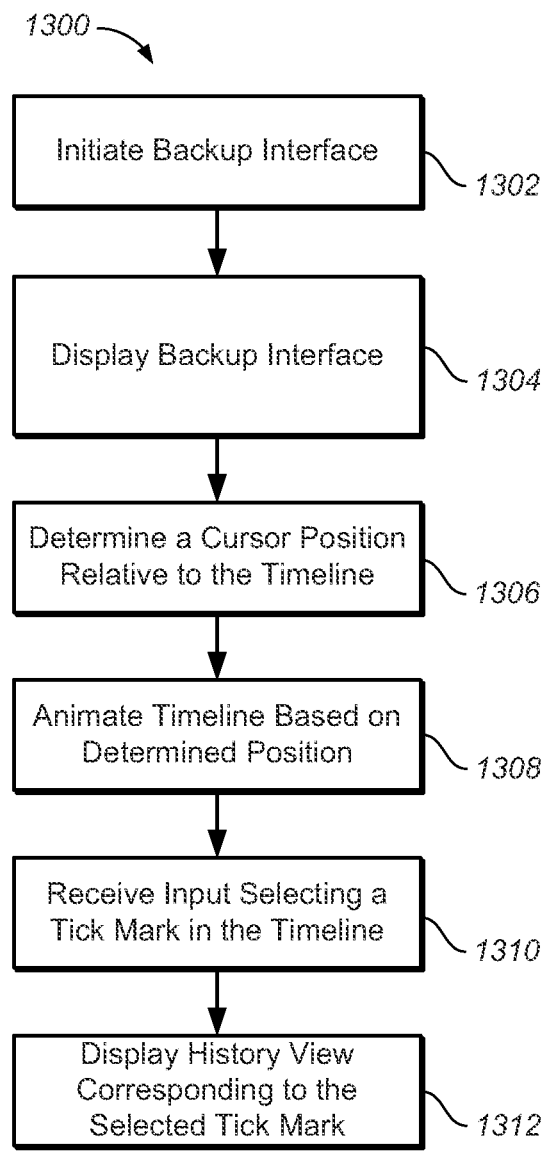
FIG. 13 is a flow chart of an example method for selecting a history view from a timeline.

FIG. 13 is a flow chart of an example method 1300 for restoring an item in a backup interface. For convenience, the method 1300 will be described with respect to a system (e.g., system 100) performing the method 1300. The system initiates (1302) a backup interface. In some implementations, a user can initiate a backup interface from a user interface (e.g., a desktop user interface). For example, a backup interface icon can be provided in the user interface (e.g., by the backup component 117). Alternatively, the backup component can initiate the backup interface in response to a user selected menu item. For example, using a drop down menu in the user interface. The system can initiate the backup interface using techniques similar to those described above with respect to FIG. 3.

The system displays (1304) the backup interface. The backup interface can include multiple history views with respect to the current view. The history views can be visual representations of the backup data presented in the history view. In some implementations, the history views are presented in the form of snapshots. The snapshot can also represent the current view in the backup interface. In some implementations, the snapshots are arranged in a cascading stack, where each next snapshot moving through the stack corresponds to a point in time further in the past relative to the current view (e.g., presented at the top of the stack), as described above.

For example, if the user activated the backup interface from an interface of a particular application, each snapshot can provide a visual representation of the application's user interface corresponding to the state when the corresponding backup occurred. Similarly, if the user activated the backup interface from a particular point in the file system using the navigation interface, the snapshots can provide representations of the navigation interface at particular points in time. As a result, the user can visually identify items in snapshots for restoration or restore an entire state (e.g., of an application) represented by the snapshot.

The backup component can represent snapshots in the backup interface in other ways, for example, as a timeline of markers (e.g., tick marks) within the backup interface. The user can select a particular tick mark to select a specific snapshot. When a user selects a particular snapshot, the selected snapshot is presented as a current snapshot at the top of the stack of snapshots.

The system determines (1306) a cursor position relative to the timeline. For example, the position of a cursor can be determined as it changes position within the backup interface (e.g., corresponding to a user movement of a mouse device). The position can be determined, for example, according to a pixel location of the cursor relative to the pixels forming the timeline in the backup interface. Additionally, the movements of the cursor within the backup interface can be tracked by the backup component.

The system animates (1308) the timeline based on the determined cursor position. For example, the backup component can provide a dynamic animation of the timeline that is responsive to cursor position. For example, the timeline can expand as the cursor approaches a particular region of the timeline. The expansion can include enlarging the timeline as well as increasing the number of tick marks to enhance resolution. For example, a condensed tick mark in the timeline, before expansion, can represent multiple tick marks where each of the condensed tick marks corresponds to a particular history view. That single tick mark can expand to the multiple tick marks as the cursor approaches in order to display the underlying tick marks. Each of the underlying tick marks can correspond to a particular history view. In some implementations, a date can be displayed for the history view corresponding to a closest proximity tick mark (with reference to the cursor).

In some implementations, the system automatically scrolls the timeline toward the center if the cursor position is near either end of the timeline. For example, if the system determines a cursor position at a top edge of the timeline, the animation can scroll the timeline and cursor downward by some amount. The cursor is scrolled with the timeline to maintain the positional relationship between a particular tick mark and the cursor. In some implementations, the scroll is only enough to allow nearby tick marks to expand fully during the animation. In other implementations, the scroll brings the cursor, and corresponding point in the timeline to the vertical center of the interface.

The system receives (1310) input selecting a tick mark in the timeline. For example, once the user has identified a specific tick mark, the tick mark can be selected using the input device. For example, the user can identify the particular tick mark for selection according to the displayed date information associated with the tick mark. The user can then select the tick mark in order to view the associated history view (e.g., as a snapshot).

The system displays (1312) a history view corresponding to the selected tick mark. For example, when the user selects a tick mark corresponding to a particular history view, the history view can be presented in the backup interface as the current snapshot (e.g., a topmost snapshot) in the backup interface. The user can then view or select, or otherwise navigate the items in the snapshot. In some implementations, the user can restore one or more selected items or the entire view to the current view. Alternatively, the user can select a new snapshot to view, e.g., using the timeline.

FIGS. 14-23 are screenshots depicting an example timeline animation.

Figure 14:
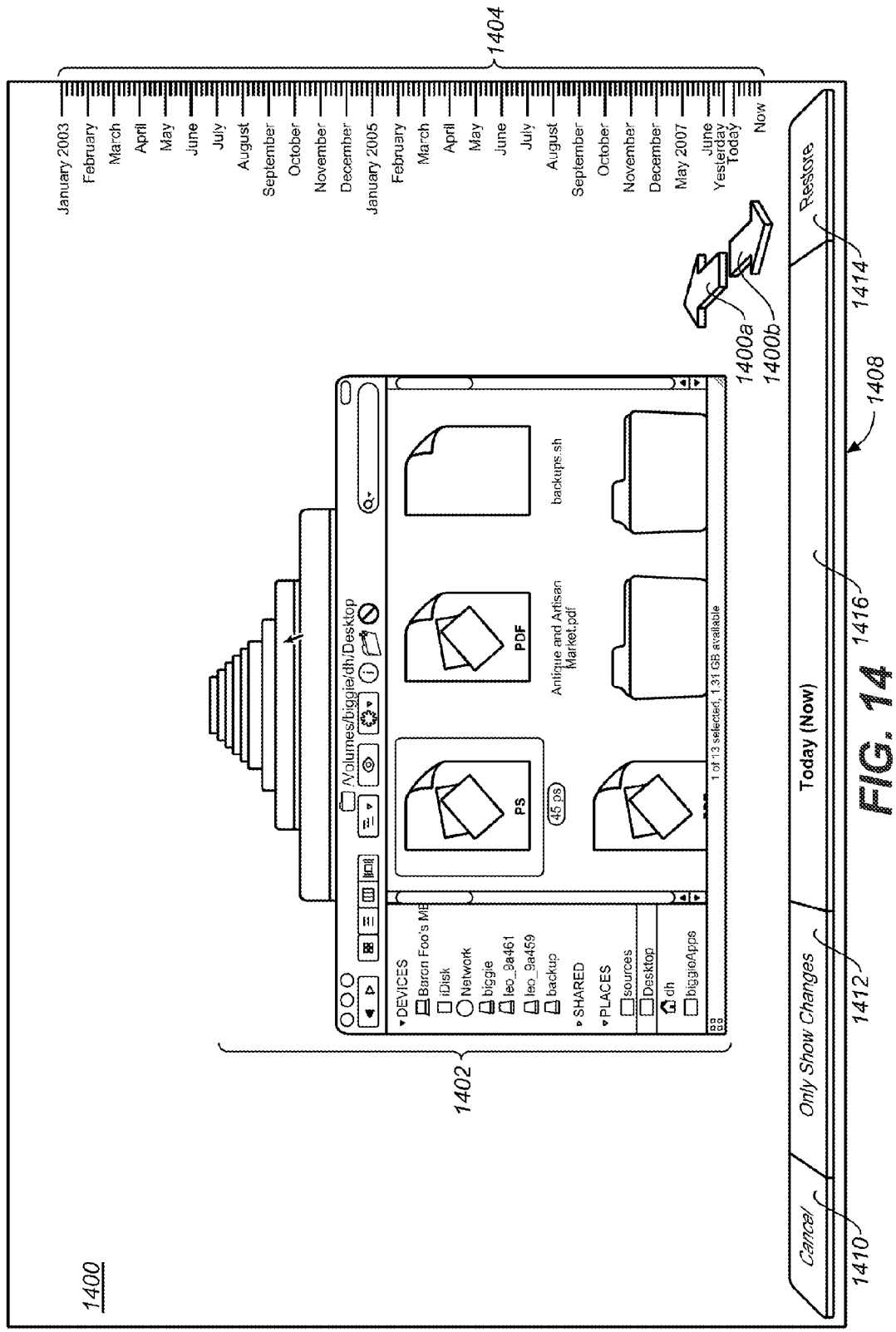

FIG. 14 shows a backup interface 1400. The backup user interface includes snapshots 1402, timeline 1404, navigation controls 1406a-b, and a control bar 1408 including, for example, a "cancel" control 1410, an "only show changes" control 1412, and a "restore" control 1414. The control bar 1408 can also include a date display 1416, which displays the date of the topmost snapshot of snapshots 1402.

The "cancel" control 1410 can allow the user to cancel the restoration of one or more files or items. In some implementations, canceling a restoration will also lead to exiting the backup interface and returning, for example, to a desktop user interface (e.g., user interface 400 of FIG. 4). The "restore" control 1414 can allow a user to restore a selected item in a snapshot to the current view (e.g., to the current view of the file system).

In some implementations, the "restore" control 1414 can be used to restore the entire contents of the selected snapshot e.g., restore the current file system state with all the files or items in a currently selected snapshot. The "only show changes" control 1412 can allow a user to select whether or not snapshots without changed items will be presented in the backup interface. In some implementations, the "only show changes" control 1412 can be toggled to display a "show all" control.

In FIG. 14, the current snapshot 1420 (e.g., the topmost snapshot) represents the current view of the navigation interface. Thus, the date display 1416 displays the date of the snapshot as "Today (Now)". Additionally, the contents of the current snapshot 1420 correspond to the contents of the navigation interface 1402, in particular, the snapshot 1420 includes the item 1406.

Figure 15:
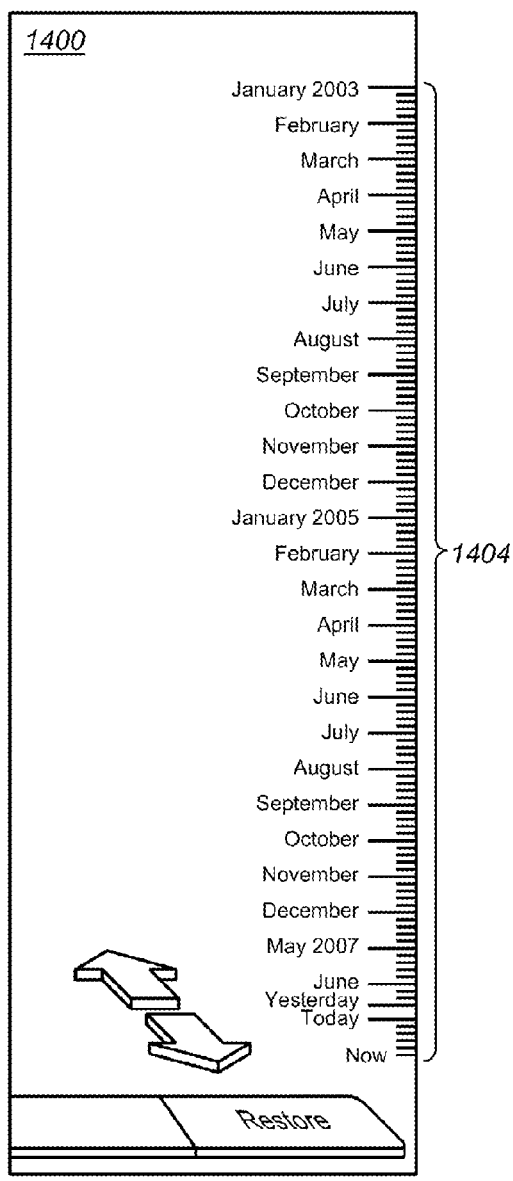

FIG. 15 shows a portion of the backup interface 1400 focusing on the timeline 1402. In addition, FIG. 15 shows a condensed state of the timeline 1402 in which the entire timeline is shown (e.g., tick marks representing all available snapshots in the backup component). In some implementations, the timeline 1402 is represented as a vertical column of timeline items, referred to here as tick marks. Each tick mark represents one or more snapshots. In some implementations, the timeline arranges tick marks beginning from the bottom with a tick mark representing the current view (e.g., the current state of the file system as shown in the navigation interface). Moving up the timeline 1402 from the current view are tick marks representing snapshots from the most recent to the oldest available snapshot. Other layouts of the timeline in the backup interface are possible.

One or more tick marks can include data labels at various positions in the timeline 1402. For example, the timeline 1402 labels the current view in FIG. 15 as "now". Other tick marks can include labels representing months and years, e.g., "January 2003" and "May 2007". Thus, the timeline 1402 encompasses a range from a first snapshot taken in January 2003 to the present state in June 2007.

In some implementations, there is a limit to the number of tick marks that can be presented in the timeline 1402. For example, if each tick mark is represented by a horizontal line having a height of two pixels and each tick mark is separated by a space having a height of 10 pixels, 100 tick marks would require 1190 vertical pixels. Consequently, timeline 1402, in an compressed state, can include compressed tick marks that are associated with multiple snapshots. In some implementations, the spacing between tick marks in the timeline 1402 is variable. For example, as snapshots are added during backup operations, the corresponding tick marks are added to the timeline 1402. As the number increases, the spacing between each tick mark can be reduced, e.g., incrementally until a minimum pixel spacing is reached.

The backup component can determine a compression for the timeline when there are more individual tick marks than vertical space in the backup interface. Those individual tick marks can be compressed according to specified criteria. In one implementation, the compression initially calculates two timelines. The first represents the maximum number of tick marks that can fit in the available space using the minimal spacing between tick marks. The first timeline will be the final timeline. The backup component calculates the second timeline by reducing the spacing until all of the tick marks fit within the total available space.

The backup component then calculates a span of each tick mark in the first timeline. The backup component calculates the span, for example, including determining two points based on the center point of the tick mark. In one implementation, the points define a distance plus or minus one-half the minimum spacing amount from the center point. Each tick mark in the first timeline spans either one or multiple tick marks in the second timeline. If a tick mark in the timeline spans only one tick mark, than the backup component replaces the tick mark with only that tick mark. However, if a tick mark in the first timeline spans multiple tick marks in the second timeline, than the backup component replaces the tick mark with a condensed tick mark that contains/references all of the spanned tick marks.

Figure 16:
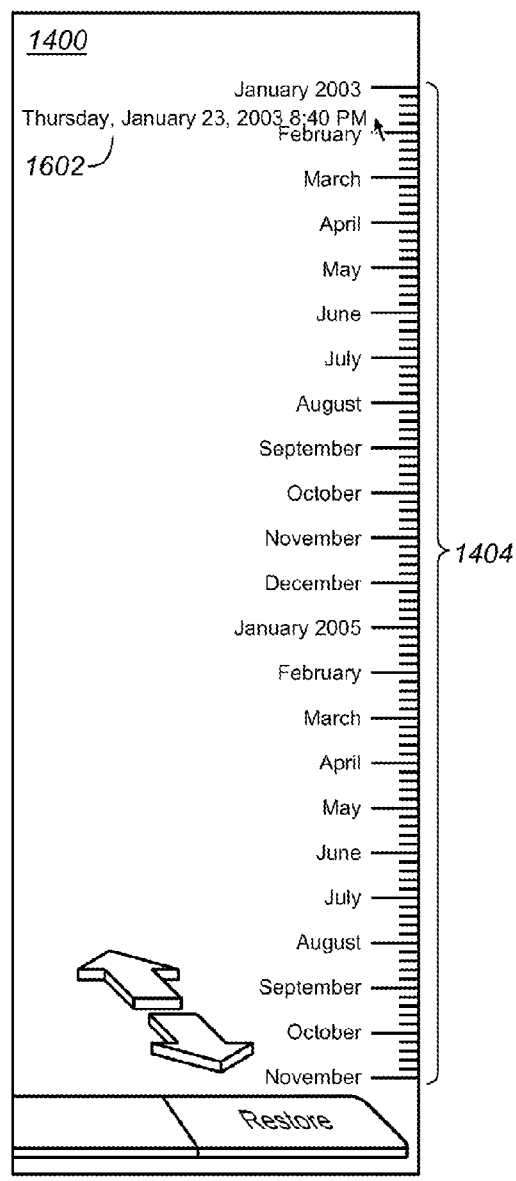

FIG. 16 shows an implementation of the timeline 1402 where the cursor has moved to a particular tick mark near the top of the timeline 1402 (e.g., corresponding to the oldest snapshots). In particular, the position of the cursor is between "January 2003" and "February 2003" data labels on the timeline 1402.

In some implementations, the backup component can delay the animation such that the cursor can reach a particular point in the timeline 1402 before animation occurs. Similarly, if all the snapshots are visible in the compressed timeline 1402 (e.g., each tick mark represents a single snapshot), then no animation need occur. Alternatively, the animation can begin when the cursor position is within a threshold distance relative to the timeline 1402.

As shown in FIG. 16, the animation has begun such that the tick marks in the timeline 1402 appear thicker. Additionally, they have expanded such that the bottom of the timeline 1402 does not extend to the most recent tick marks. Instead, the visible timeline 1402 now ends with a most recent date label of November 2005. A date display 1602 is presented, identifying the date of the snapshot in closest proximity to the cursor. For example, in FIG. 16, the date display 1602 reveals that the cursor is in closest proximity to a tick mark representing a snapshot dated "Thursday, Jan. 23, 2003 8:40 PM".

Figure 17:
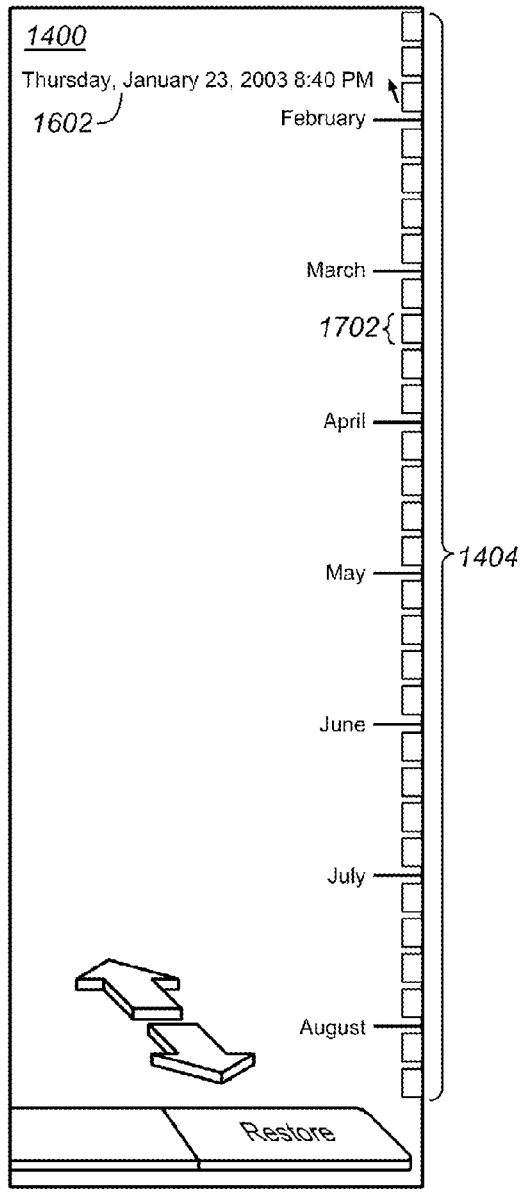

FIG. 17 shows the timeline 1402 of FIG. 16 as the animation continues. The animation expands the timeline 1402 toward an expanded state in order present additional snapshots (and associated tick marks). As the timeline animates, the timeline 1402 can maintain the position of the tick mark closest to the cursor (e.g., the user maintains a cursor position over the same tick mark throughout the animation). Thus, the date display 1602 remains the same. In FIG. 17, the timeline has continued to expand such that the visible timeline has a range between January and August 2003. The tick marks between each month represented in the timeline 1402 have increased in height, appearing as blocks 1702.

Figure 18:
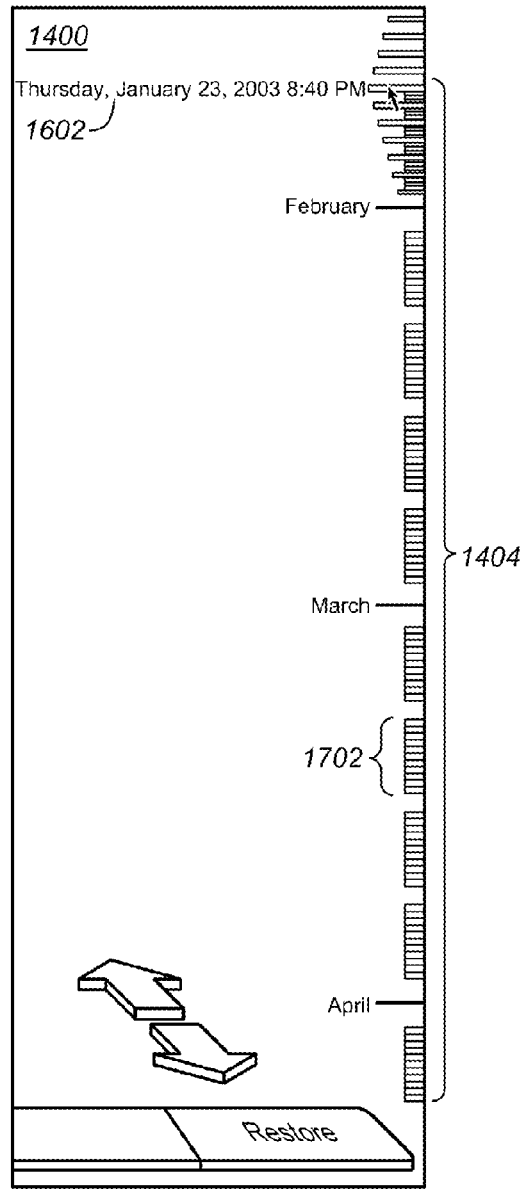

FIG. 18 shows the timeline 1402 of FIG. 17 after additional animation. Specifically, in FIG. 18, the timeline has expanded further such that the earliest shown date label is April 2003 instead of August 2003. As a result, the vertical distance between date labels (e.g., months) has increased. Within that space, the tick mark blocks 1702 have increased in height and additional tick marks within those blocks are becoming visible. Additionally, the tick marks near the cursor position can expand horizontally such that the tick mark in closest proximity to the cursor is most prominent.

Figure 19:
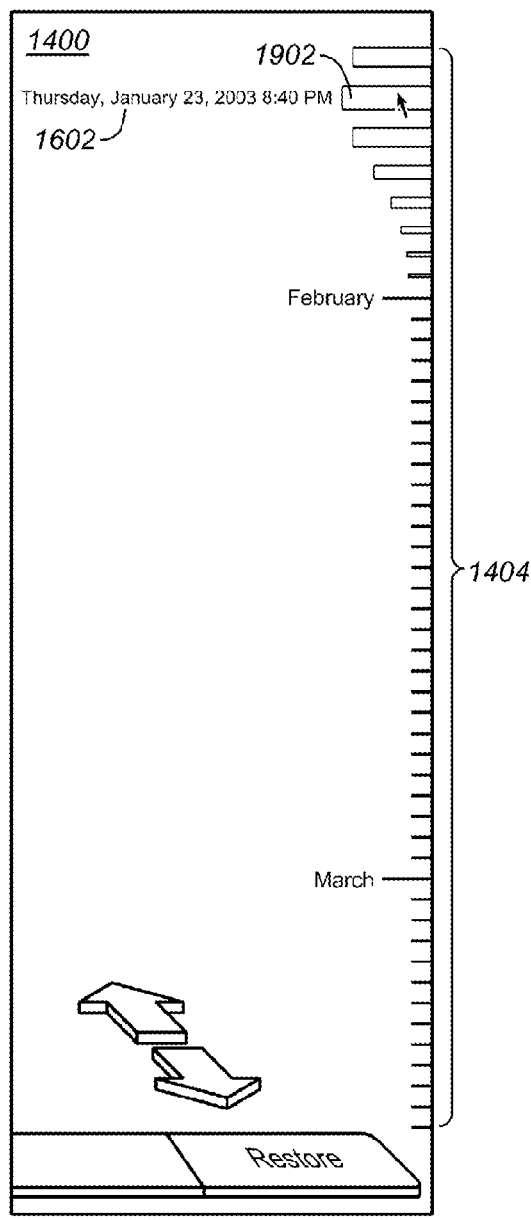

FIG. 19 shows the timeline 1402 after complete expansion of the timeline 1402 to a magnified state. The timeline has expanded so that each tick mark shown corresponds to a single snapshot. Thus, as shown in this example, there is a snapshot taken once a day so that there is a corresponding tick mark in the magnified state of the timeline 1402 for each day. Additionally, the backup component can apply a magnification to the tick mark corresponding to the cursor position. For example, the identified tick mark 1902, corresponding to the cursor position, is emphasized (e.g., enlarged) as compared to the other tick marks, for example, to enhance the identification of the selected tick mark.

In some implementations, the enlargement includes horizontal and vertical thickening of the identified tick mark 1902. In other implementations, the magnification also enlarges the tick marks adjacent to the identified tick mark 1902, though to a lesser extent (e.g., forming a bell curve shape with the selected tick mark 1902 in the center). The user can select the identified tick mark 1902 in order to display the corresponding snapshot in the backup interface.

Figure 20:
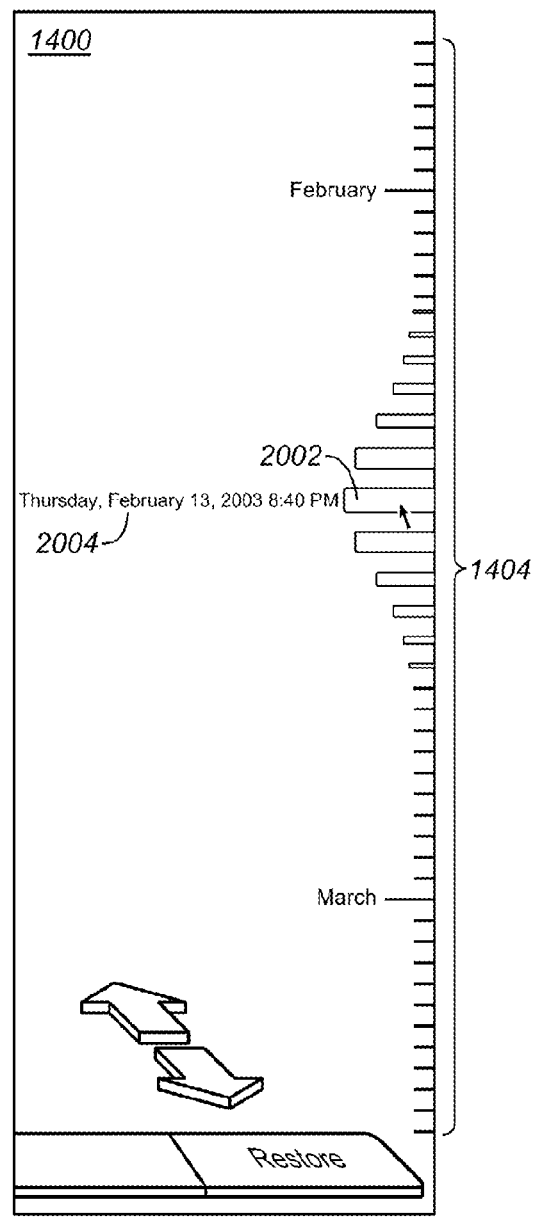

FIG. 20 shows user navigation between tick marks while the timeline 1402 remains in the expanded state. The user can move the cursor (e.g., with the mouse) along the timeline 1420 to a different tick mark. As the cursor moves, the date (e.g., snapshot) in closest proximity to the cursor) changes accordingly. Additionally, in one implementation, the magnification of the tick mark identified by the cursor position dynamically moves with the cursor. For example, as shown in FIG. 20, the user has moved the cursor down the timeline 1402 to identify a tick mark 2002. The tick mark 2002 has a data 2004 of "Thursday, Feb. 13, 2003 8:40 PM". Additionally, the timeline 1402 shows the identified tick mark 2002 in the enlarged state. The previously identified tick mark 1902 returned to an unmagnified state corresponding to the other tick marks in the timeline 1402.

When the user moves the cursor away from the timeline, for example, after selecting a particular snapshot for display or to navigate to a different portion of the timeline, the timeline returns to the condensed state.

Figure 23:
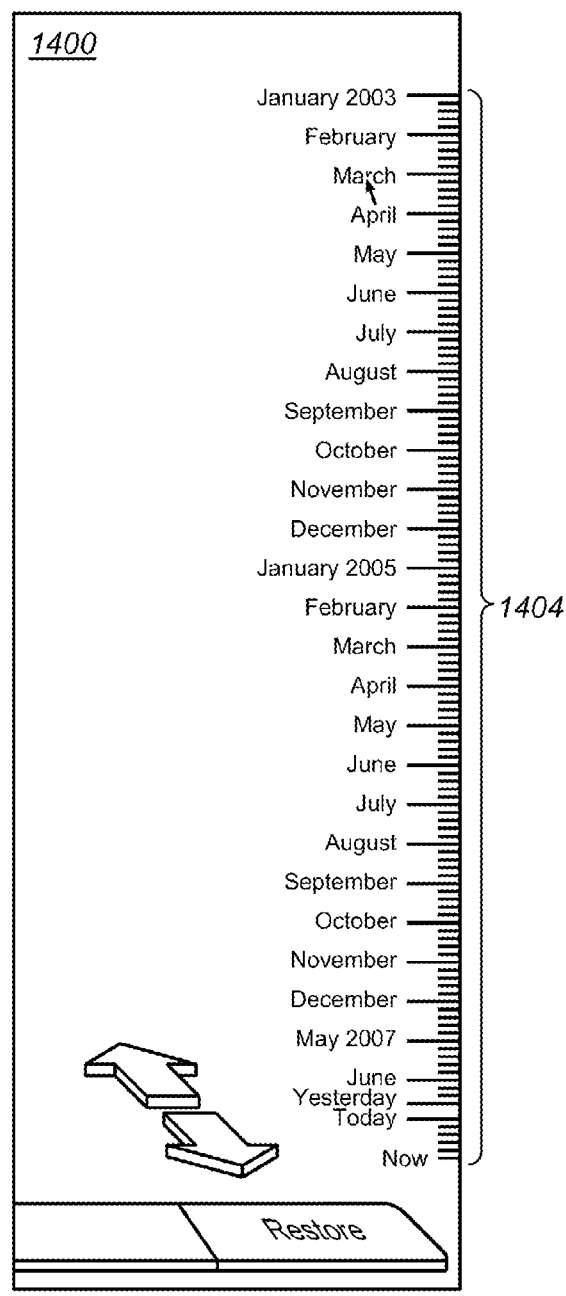

FIGS. 21-23 show an example animation illustrating a gradual condensing of the timeline 1402 to the condensed state. In FIG. 21, the user has moved the cursor away from the timeline, initiating the animation. The tick marks begin to combine to form blocks in the timeline 1401. As the tick marks combine, more of the timeline 1402 becomes visible within the backup interface. Finally, the timeline 1402 returns to the condensed state shown in FIG. 23. In FIG. 23, the timeline 1402 includes the entire timeline 1402 representing all available backup snapshots.

Figure 24:
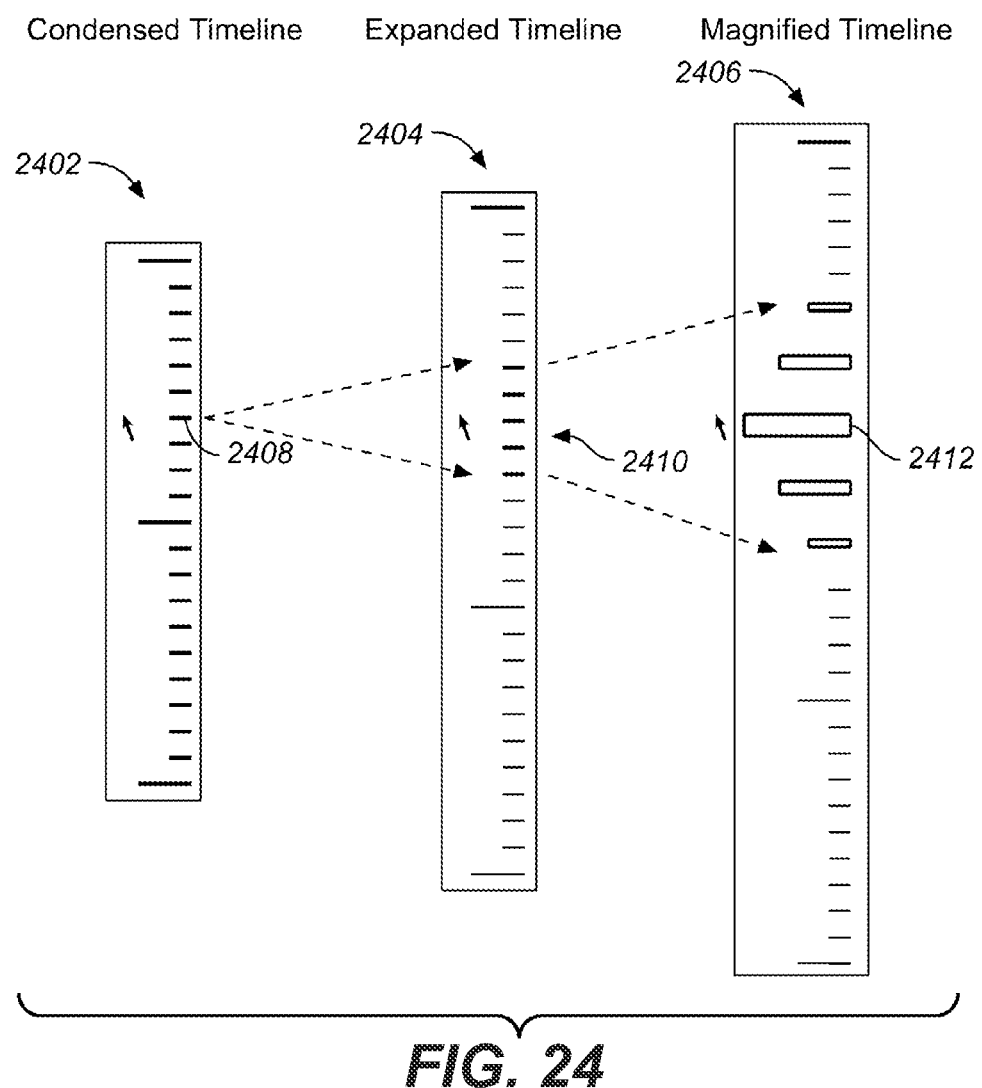
FIG. 24 shows an example of tick mark expansion.

FIG. 24 shows an example of tick mark expansion. FIG. 24 includes an example condensed timeline 2402, an expanded timeline 2404, and a magnified timeline 2406. In the condensed timeline 2402, each displayed tick mark represents multiple individual tick marks. The expanded timeline 2402 expands each tick mark in the condensed timeline 2402 to the underlying tick marks representing individual snapshots. For example, the compressed tick mark 2408 in the condensed timeline 2402 is expanded in the expanded timeline 2404 to five individual snapshots 2410. Additionally, because of the expansion, the overall timeline is longer in the expanded timeline 2404 as compared to the condensed timeline 2402. Finally, the magnified timeline 2406 includes the same number of tick marks as in the expanded timeline 2404, however, particular tick marks are magnified. For example, a tick mark 2412 can correspond to the tick mark associated with a cursor position. The tick mark 2412 is therefore magnified, becoming larger in height and/or width relative to the other tick marks. Additionally, the magnification can smoothly transition such that a specified number of adjacent tick marks to the tick mark 2412 are partially magnified according to proximity to the tick mark 2412.

In the above description, for purposes of explanation, numerous specific details are set forth in order to provide a thorough understanding. It will be apparent, however, to one skilled in the art that implementations can be practiced without these specific details. In other instances, structures and devices are shown in block diagram form in order to avoid obscuring the disclosure.

In particular, one skilled in the art will recognize that other architectures and graphics environments can be used, and that the examples can be implemented using graphics tools and products other than those described above. In particular, the client/server approach is merely one example of an architecture for providing the functionality described herein; one skilled in the art will recognize that other, non-client/server approaches can also be used. Some portions of the detailed description are presented in terms of algorithms and symbolic representations of operations on data bits within a computer memory. These algorithmic descriptions and representations are the means used by those skilled in the data processing arts to convey most effectively the substance of their work to others skilled in the art. An algorithm is conceived here, and generally, to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

An apparatus for performing the operations herein can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it can prove convenient to construct more specialized apparatuses to perform the method steps. The required structure for a variety of these systems will appear from the description. In addition, the present examples are not described with reference to any particular programming language. It will be appreciated that a variety of programming languages can be used to implement the teachings as described herein. Furthermore, as will be apparent to one of ordinary skill in the relevant art, the modules, features, attributes, methodologies, and other aspects can be implemented as software, hardware, firmware or any combination of the three. Of course, wherever a component is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present description is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A method comprising:
displaying a backup interface, the backup interface including a display area for presenting at least a first visual representation of an earlier version of a user interface window and a visual representation of a current view of the user interface window, the earlier versions of the user interface window including a first file, wherein the earlier version of the user interface window includes a representation of a first file and a representation of a second file;
receiving, while the backup interface is displayed, a first user input requesting that the first file be restored to the current view of the user interface window without restoring the second file to the current view of the user interface window;
in response to the first user input:
displaying an animation of the representation of the first file moving from the first visual representation of the earlier version of the user interface window to the visual representation of the current view of the user interface window without displaying an animation of the representation of the second file moving from the first visual representation of the earlier version of the user interface window to the visual representation of the current view of the user interface window; and restoring data associated with the first visual representation of the user interface window corresponding to the first file, including restoring the first file from the earlier version of the user interface window without restoring the second file from the earlier version of the user interface window.

2. The method of claim 1, where displaying the animation further comprises:
lifting a copy of the representation of the first file from the visual representation of the earlier version of the user interface window;
maintaining the position of the copy of the representation of the first file while animating the visual representations such that the visual representation of the earlier version of the user interface window falls away and the visual representation of the current view of the user interface window is presented; and
adding the copy of the representation of the first file to the visual representation of the current view of the user interface window.

3. The method of claim 1, further comprising:
displaying the current view in a user interface including the user interface window, where the user interface window includes the representation the first file.

4. The method of claim 1, wherein the backup interface is closed after restoring the data.

5. The method of claim 1, wherein restoring the data includes replacing a version of the first file in the current view of the user interface window with data from a version of the first file from the first visual representation of the user interface window.

6. The method of claim 1, wherein restoring the data includes copying data from a version of the first file from the first visual representation of the user interface window to the current view of the user interface window.

7. A system comprising:
one or more processors operable to interact with a non-transitory computer-readable storage medium in order to perform operations comprising:
displaying a backup interface, the backup interface including a display area for presenting at least a first visual representation of an earlier version of a user interface window and a visual representation of a current view of the user interface window, the earlier versions of the user interface window including a first file, wherein the earlier version of the user interface window includes a representation of a first file and a representation of a second file;
receiving, while the backup interface is displayed, a first user input requesting that the first file be restored to the current view of the user interface window without restoring the second file to the current view of the user interface window;
in response to the first user input:
displaying an animation of the representation of the first file moving from the first visual representation of the earlier version of the user interface window to the visual representation of the current view of the user interface window without displaying an animation of the representation of the second file moving from the first visual representation of the earlier version of the user interface window to the visual representation of the current view of the user interface window; and
restoring data associated with the first visual representation of the user interface window corresponding to the first file, including restoring the first file from the earlier version of the user interface window without restoring the second file from the earlier version of the user interface window.

8. The system of claim 7, where displaying the animation further comprises:
lifting a copy of the representation of the first file from the visual representation of the earlier version of the user interface window;
maintaining the position of the copy of the representation of the first file while animating the visual representations such that the visual representation of the earlier version of the user interface window falls away and the visual representation of the current view of the user interface window is presented; and
adding the copy of the representation of the first file to the visual representation of the current view of the user interface window.

9. The system of claim 7, wherein the operations further comprise:
displaying the current view in the user interface including the user interface window, where the user interface window includes the representation of the first file.

10. The system of claim 7, wherein the backup interface is closed after restoring the data.

11. The system of claim 7, wherein restoring the data includes replacing a version of the first file in the current view of the user interface window with data from a version of the first file from the first visual representation of the user interface window.

12. The system of claim 7, wherein restoring the data includes copying data from a version of the first file from the first visual representation of the user interface window to the current view of the user interface window.

13. A non-transitory computer-readable medium including one or more sequences of instructions which, when executed by one or more processors, causes:
displaying the backup interface, the backup interface including a display area for presenting at least a first visual representation of an earlier version of a user interface window and a visual representation of a current view of the user interface window, the earlier versions of the user interface window including a first file, wherein the earlier version of the user interface window includes a representation of a first file and a representation of a second file;
receiving, while the backup interface is displayed, a first user input requesting that the first file be restored to the current view of the user interface window without restoring the second file to the current view of the user interface window;
in response to the first user input:
displaying an animation of the representation of the first file moving from the first visual representation of the earlier version of the user interface window to the visual representation of the current view of the user interface window without displaying an animation of the representation of the second file moving from the first visual representation of the earlier version of the user interface window to the visual representation of the current view of the user interface window; and
restoring data associated with the first visual representation of the user interface window corresponding to the first file, including restoring the first file from the earlier version of the user interface window without restoring the second file from the earlier version of the user interface window.

14. The non-transitory computer-readable medium of claim 13, where displaying the animation further comprises:
- lifting a copy of the representation of the first file from the visual representation of the earlier version of the user interface window;
- maintaining the position of the copy of the representation of the first file while animating the visual representations such that the visual representation of the earlier version of the user interface window falls away and the visual representation of the current view of the user interface window is presented; and
- adding the copy of the representation of the first file to the visual representation of the current view of the user interface window.

15. The non-transitory computer-readable medium claim 13, where displaying the animation further comprises:
- displaying the current view in a user interface including the user interface window, where the user interface window includes the representation of the first file.

16. The non-transitory computer-readable medium of claim 13, wherein the backup interface is closed after restoring the data.

17. The non-transitory computer-readable medium of claim 13, wherein restoring the data includes replacing a version of the first file in the current view of the user interface window with data from a version of the first file from the first visual representation of the user interface window.

18. The non-transitory computer-readable medium of claim 13, wherein restoring the data includes copying data from a version of the first file from the first visual representation of the user interface window to the current view of the user interface window.

* * * * *